US012460009B2

(12) United States Patent
Gosset et al.

(10) Patent No.: US 12,460,009 B2
(45) Date of Patent: Nov. 4, 2025

(54) MONOCLONAL ANTIBODIES SPECIFIC FOR IL20-Rb, ENCODING NUCLEIC ACIDS THEREOF AND METHODS OF USE THEREOF TO TREAT BACTERIAL-INDUCED EXACERBATION OF CHRONIC OBSTRUCTIVE PULMONARY DISEASE

(71) Applicants: INSERM (INSTITUT NATIONAL DE LA SANTÉ ET DE LA RECHERCHE MÉDICALE), Paris (FR); Centre National de la Recherche Scientifique (CNRS), Paris (FR); Université de Lille, Lille (FR); Institut Pasteur de Lille, Lille (FR); Université de Montpellier, Montpellier (FR); INSTITUT RÉGIONAL DU CANCER DE MONTPELLIER, Montpellier (FR)

(72) Inventors: Philippe Gosset, Lille (FR); Muriel Pichavant, Lille (FR); Pierre Martineau, Montpellier (FR); Myriam Chentouf, Montpellier (FR); Bruno Robert, Montpellier (FR); Mélina Le Roux, Tourcoing (FR)

(73) Assignees: INSERM (INSTITUT NATIONAL DE LA SANTE ET DE LA RECHERCHE MEDICALE), Paris (FR); CENTRE NATIONAL DE LA RECHERCHE SCIENTIFIQUE (CNRS), Paris (FR); UNIVERSITE DE LILLE, Paris (FR); INSTITUT PASTEUR DE LILLE, Lille (FR); UNIVERSITE DE MONTPELLIER, Montpellier (FR); INSTITUT REGIONAL DU CANCER DE MONTPELLIER, Montpellier (FR)

( * ) Notice: Subject to any disclaimer, the term of this patent is extended or adjusted under 35 U.S.C. 154(b) by 916 days.

(21) Appl. No.: 17/638,464

(22) PCT Filed: Sep. 3, 2020

(86) PCT No.: PCT/EP2020/074660
§ 371 (c)(1),
(2) Date: Feb. 25, 2022

(87) PCT Pub. No.: WO2021/043933
PCT Pub. Date: Mar. 11, 2021

(65) Prior Publication Data
US 2023/0002497 A1   Jan. 5, 2023

(30) Foreign Application Priority Data

Sep. 4, 2019   (EP) .................... 19306068

(51) Int. Cl.
*C07K 16/28*     (2006.01)
*A61K 39/00*    (2006.01)
*A61P 11/00*    (2006.01)

(52) U.S. Cl.
CPC .......... *C07K 16/2866* (2013.01); *A61P 11/00* (2018.01); *A61K 39/00* (2013.01); *C07K 2317/21* (2013.01); *C07K 2317/24* (2013.01)

(58) Field of Classification Search
CPC ............ C07K 16/2866; C07K 2317/21; C07K 2317/24; C07K 2317/33; C07K 2317/76; C07K 2317/92; C07K 2317/732; A61P 11/00; A61K 39/00; A61K 2039/505
See application file for complete search history.

(56) References Cited

FOREIGN PATENT DOCUMENTS

| WO | 2005052001 A2 | 6/2005 |
| WO | 2016083304 A1 | 6/2016 |
| WO | 2017202813 A1 | 11/2017 |

OTHER PUBLICATIONS

Invitrogen Product Information sheet for Nunc MaxiSorp® flat-bottom; Catalog No. 44-2404 (2016):1 page.*
Fahima Madouri et al., "Production of Interleukin-20 cytokines limits bacterial clearance and lung inflammation during infection by *Streptococcus pneumoniae*", Ebiomedicine, vol. 37, Nov. 1, 2018 (Nov. 1, 2018), p. 417-427.

* cited by examiner

*Primary Examiner* — Robert S Landsman
(74) *Attorney, Agent, or Firm* — WCF IP

(57) ABSTRACT

Chronic obstructive pulmonary disease (COPD) remains a major cause of morbidity and mortality worldwide. Acute exacerbation of COPD (AE-COPD) in patients are mostly due to respiratory infection and are associated with an inexorable decline in lung function, enhanced oedema as well as airway and systemic inflammation. Previous results show that treatment with anti-IL-20Rb blocking antibodies increased the bacterial clearance in control mice infected by *S. pneumoniae* and protected CS-exposed mice from bacterial infection, by decreasing the bacterial burden and the inflammatory infiltrate. Therefore there is an interest for generating monoclonal antibodies specific for IL-20Rb with a neutralizing activity for their use in the treatment of AE-COPD. The present invention fulfills this need by providing antibodies having specificity for IL-20Rb.

19 Claims, 8 Drawing Sheets

Figure 1:
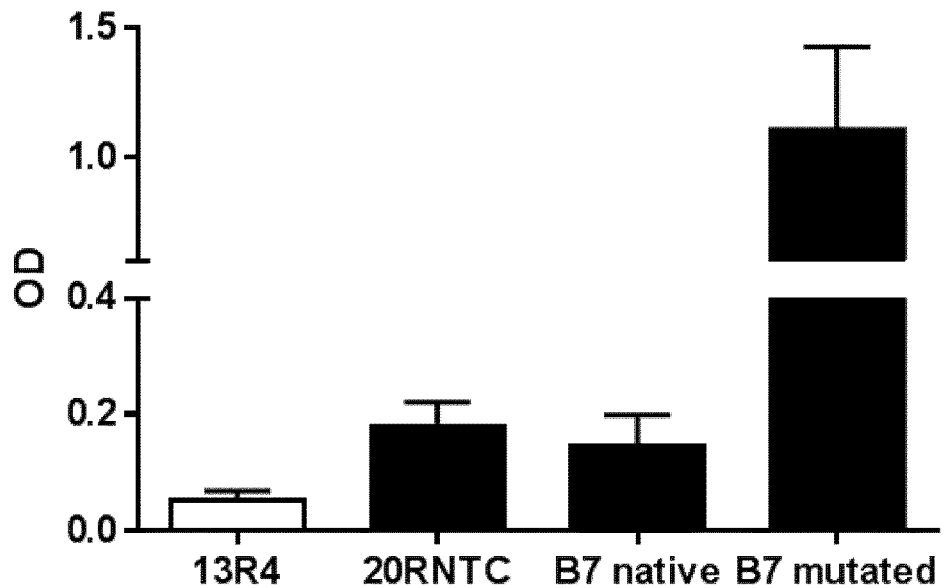

Specification includes a Sequence Listing.

SEQUENCE LISTING

```
<160> NUMBER OF SEQ ID NOS: 12

<210> SEQ ID NO 1
<211> LENGTH: 311
<212> TYPE: PRT
<213> ORGANISM: Homo sapiens

<400> SEQUENCE: 1

Met Gln Thr Phe Thr Met Val Leu Glu Glu Ile Trp Thr Ser Leu Phe
1               5                   10                  15

Met Trp Phe Phe Tyr Ala Leu Ile Pro Cys Leu Leu Thr Asp Glu Val
            20                  25                  30
```

```
Ala Ile Leu Pro Ala Pro Gln Asn Leu Ser Val Leu Ser Thr Asn Met
         35                  40                  45

Lys His Leu Leu Met Trp Ser Pro Val Ile Ala Pro Gly Glu Thr Val
 50                  55                  60

Tyr Tyr Ser Val Glu Tyr Gln Gly Tyr Glu Ser Leu Tyr Thr Ser
 65                  70                  75                  80

His Ile Trp Ile Pro Ser Ser Trp Cys Ser Leu Thr Glu Gly Pro Glu
                     85                  90                  95

Cys Asp Val Thr Asp Asp Ile Thr Ala Thr Val Pro Tyr Asn Leu Arg
                 100                 105                 110

Val Arg Ala Thr Leu Gly Ser Gln Thr Ser Ala Trp Ser Ile Leu Lys
             115                 120                 125

His Pro Phe Asn Arg Asn Ser Thr Ile Leu Thr Arg Pro Gly Met Glu
         130                 135                 140

Ile Thr Lys Asp Gly Phe His Leu Val Ile Glu Leu Glu Asp Leu Gly
145                 150                 155                 160

Pro Gln Phe Glu Phe Leu Val Ala Tyr Trp Arg Arg Glu Pro Gly Ala
                 165                 170                 175

Glu Glu His Val Lys Met Val Arg Ser Gly Gly Ile Pro Val His Leu
             180                 185                 190

Glu Thr Met Glu Pro Gly Ala Ala Tyr Cys Val Lys Ala Gln Thr Phe
         195                 200                 205

Val Lys Ala Ile Gly Arg Tyr Ser Ala Phe Ser Gln Thr Glu Cys Val
     210                 215                 220

Glu Val Gln Gly Glu Ala Ile Pro Leu Val Leu Ala Leu Phe Ala Phe
225                 230                 235                 240

Val Gly Phe Met Leu Ile Leu Val Val Pro Leu Phe Val Trp Lys
                 245                 250                 255

Met Gly Arg Leu Leu Gln Tyr Ser Cys Cys Pro Val Val Leu Pro
                 260                 265                 270

Asp Thr Leu Lys Ile Thr Asn Ser Pro Gln Lys Leu Ile Ser Cys Arg
         275                 280                 285

Arg Glu Glu Val Asp Ala Cys Ala Thr Ala Val Met Ser Pro Glu Glu
     290                 295                 300

Leu Leu Arg Ala Trp Ile Ser
305                 310

<210> SEQ ID NO 2
<211> LENGTH: 5
<212> TYPE: PRT
<213> ORGANISM: Artificial
<220> FEATURE:
<223> OTHER INFORMATION: Synthetic H-CDR1
<220> FEATURE:
<221> NAME/KEY: MISC_FEATURE
<222> LOCATION: (3)..(3)
<223> OTHER INFORMATION: X is S or A

<400> SEQUENCE: 2

Asn Tyr Xaa Met Asn
1               5

<210> SEQ ID NO 3
<211> LENGTH: 17
<212> TYPE: PRT
<213> ORGANISM: Artificial
<220> FEATURE:
<223> OTHER INFORMATION: Synthetic H-CDR2
```

-continued

```
<400> SEQUENCE: 3

Tyr Ile Ser Gly Ser Ser Arg Tyr Ile Ser Tyr Ala Asp Phe Val Lys
1               5                   10                  15

Gly

<210> SEQ ID NO 4
<211> LENGTH: 7
<212> TYPE: PRT
<213> ORGANISM: Artificial
<220> FEATURE:
<223> OTHER INFORMATION: Synthetic H-CDR3

<400> SEQUENCE: 4

Ser Tyr Tyr Gly Met Asp Val
1               5

<210> SEQ ID NO 5
<211> LENGTH: 14
<212> TYPE: PRT
<213> ORGANISM: Artificial
<220> FEATURE:
<223> OTHER INFORMATION: Synthetic L-CDR1

<400> SEQUENCE: 5

Ala Gly Thr Ser Ser Asp Val Gly Gly Asn Tyr Tyr Val Ser
1               5                   10

<210> SEQ ID NO 6
<211> LENGTH: 7
<212> TYPE: PRT
<213> ORGANISM: Artificial
<220> FEATURE:
<223> OTHER INFORMATION: Synthetic L-CDR2

<400> SEQUENCE: 6

Gly Asp Ser Tyr Arg Pro Ser
1               5

<210> SEQ ID NO 7
<211> LENGTH: 10
<212> TYPE: PRT
<213> ORGANISM: Artificial
<220> FEATURE:
<223> OTHER INFORMATION: Synthetic L-CDR3

<400> SEQUENCE: 7

Ser Ser Tyr Thr Tyr Tyr Ser Thr Arg Val
1               5                   10

<210> SEQ ID NO 8
<211> LENGTH: 5
<212> TYPE: PRT
<213> ORGANISM: Artificial
<220> FEATURE:
<223> OTHER INFORMATION: Synthetic H-CDR1

<400> SEQUENCE: 8

Asn Tyr Ser Met Asn
1               5

<210> SEQ ID NO 9
<211> LENGTH: 5
<212> TYPE: PRT
<213> ORGANISM: Artificial
<220> FEATURE:
<223> OTHER INFORMATION: Synthetic H-CDR1
```

<400> SEQUENCE: 9

Asn Tyr Ala Met Asn
1               5

<210> SEQ ID NO 10
<211> LENGTH: 116
<212> TYPE: PRT
<213> ORGANISM: Artificial
<220> FEATURE:
<223> OTHER INFORMATION: Synthetic Heavy Chain of B7

<400> SEQUENCE: 10

Glu Val Gln Leu Val Glu Ser Gly Gly Ser Leu Val Lys Pro Gly Gly
1               5                   10                  15

Ser Leu Arg Leu Ser Cys Ala Ala Ser Gly Phe Thr Phe Ser Asn Tyr
            20                  25                  30

Ser Met Asn Trp Val Arg Gln Ala Pro Gly Lys Gly Leu Glu Trp Ile
        35                  40                  45

Ser Tyr Ile Ser Gly Ser Ser Arg Tyr Ile Ser Tyr Ala Asp Phe Val
    50                  55                  60

Lys Gly Arg Phe Thr Ile Ser Arg Asp Asn Ala Thr Asn Ser Leu Tyr
65                  70                  75                  80

Leu Gln Met Asn Ser Leu Arg Ala Glu Asp Thr Ala Val Tyr Tyr Cys
                85                  90                  95

Val Arg Ser Tyr Tyr Gly Met Asp Val Trp Gly Arg Gly Thr Leu Val
            100                 105                 110

Thr Val Ser Ser
        115

<210> SEQ ID NO 11
<211> LENGTH: 116
<212> TYPE: PRT
<213> ORGANISM: Artificial
<220> FEATURE:
<223> OTHER INFORMATION: Synthetic Heavy Chain of B7mut

<400> SEQUENCE: 11

Glu Val Gln Leu Val Glu Ser Gly Gly Ser Leu Val Lys Pro Gly Gly
1               5                   10                  15

Ser Leu Arg Leu Ser Cys Ala Ala Ser Gly Phe Thr Phe Ser Asn Tyr
            20                  25                  30

Ala Met Asn Trp Val Arg Gln Ala Pro Gly Lys Gly Leu Glu Trp Ile
        35                  40                  45

Ser Tyr Ile Ser Gly Ser Ser Arg Tyr Ile Ser Tyr Ala Asp Phe Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Val Arg Ser Tyr Tyr Gly Met Asp Val Trp Gly Arg Gly Thr Leu Val
            100                 105                 110

Thr Val Ser Ser
        115

<210> SEQ ID NO 12
<211> LENGTH: 111
<212> TYPE: PRT
<213> ORGANISM: Artificial

<220> FEATURE:
<223> OTHER INFORMATION: Synthetic Light Chain of B7 and B7mut

<400> SEQUENCE: 12

```
Gln Ser Val Leu Thr Gln Pro Ala Ser Val Ser Gly Ser Pro Gly Gln
1               5                   10                  15

Ser Ile Thr Ile Ser Cys Ala Gly Thr Ser Ser Asp Val Gly Gly Asn
            20                  25                  30

Tyr Tyr Val Ser Trp Tyr Gln Gln His Pro Gly Lys Ala Pro Lys Leu
        35                  40                  45

Met Ile Tyr Gly Asp Ser Tyr Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Tyr Tyr
                85                  90                  95

Ser Thr Arg Val Phe Gly Gly Gly Thr Lys Leu Ala Val Leu Gly
                100                 105                 110
```

MONOCLONAL ANTIBODIES SPECIFIC FOR IL20-Rb, ENCODING NUCLEIC ACIDS THEREOF AND METHODS OF USE THEREOF TO TREAT BACTERIAL-INDUCED EXACERBATION OF CHRONIC OBSTRUCTIVE PULMONARY DISEASE

FIELD OF THE INVENTION

The present invention relates to the field of medicine, in particular of immunology.

BACKGROUND OF THE INVENTION

Chronic obstructive pulmonary disease (COPD) remains a major cause of morbidity and mortality worldwide. This will be the third cause of deaths worldwide in 2030 according to the WHO. COPD is a lung disorder characterized by progressive and irreversible airflow limitation. Cigarette smoking is a primary risk factor for the development of COPD. Chronic exposure to cigarette smoke (CS) triggers inflammatory processes which ultimately alter lung barrier functions and reduce immune defense mechanisms, leading to increased susceptibility to respiratory infections. Such infections further alter the clinical status of COPD patients, indirectly causing extensive morbidity and mortality. Acute exacerbation of COPD (AE-COPD) in patients is associated with an inexorable decline in lung function, enhanced oedema as well as airway and systemic inflammation. Bacterial infections by *Streptococcus pneumonia* and *Haemophilus influenzae* are the major cause of AE-COPD (1). The outcome of the infection is tightly related to the efficiency of the anti-bacterial host response. Among the factors orchestrating the anti-bacterial response, Th17 cytokines, including interleukin (IL)-17 and IL-22, play a major role in the clearance of *S. pneumoniae* by modulating the secretion of antimicrobial peptides and the recruitment of effector cells (4, 5). These cytokines also maintain the lung homeostasis by limiting tissue injury, this process being essential in order to prevent secondary bacterial invasion (6, 7). IL-22 with IL-19, IL-20, IL-24 and IL-26 belong to the IL-20 cytokine family. IL-19, IL-20 and IL-24 all bind the type I IL-20 receptor (IL-20R), a heterodimeric receptor composed of the IL-20Ra and IL-20Rb chains (8, 9). Moreover, IL-20 and IL-24 bind the type II IL-20R a heterodimeric receptor composed of the IL-22 receptor-a1 subunit and IL-20Rb. Thus blocking antibodies against IL-20Rb subunit can efficiently neutralize this pathway. These IL-20 receptors are mainly expressed on epithelial cells and mononuclear phagocytes, but also on activated neutrophils and some lymphocytes (8, 10). The role of IL-20 related cytokines is controversial and exhibited "anti-inflammatory" effects involved in the cutaneous tissue homeostasis and wound-healing. However, Myles et al. have shown that IL-20 related cytokines promote cutaneous *Staphylococcus aureus* infection in mice by downregulating IL-17 and IL-22 production (11). Previous data demonstrated that IL-20 cytokines are induced by *S. pneumoniae* (12). In COPD mice, exposure to CS led to higher expression of IL-19 and IL-20 mRNA in the lung and infection with *S. pneumoniae* markedly enhanced the expression of IL-19, IL-20 and IL-24. In an experimental model mimicking the COPD disease in mice developed by chronic exposure to cigarette smoke (CS) (13), it was shown that an increased susceptibility to respiratory pathogens was related to defective IL-22 production (14, 15). In contrast these animals exhibited an increased expression of IL-19, IL-20 and IL-24 in response to *S. pneumoniae* or NTHi. Treatment with anti-IL-20Rb blocking antibodies increased the bacterial clearance in control mice infected by *S. pneumoniae* (12) and protected CS-exposed mice from bacterial infection, by decreasing the bacterial burden and the inflammatory infiltrate (WO2016083304). Therefore, there is an interest for generating monoclonal antibodies specific for IL-20Rb with a neutralizing activity for their use in the treatment of AE-COPD.

SUMMARY OF THE INVENTION

As defined by the claims, the present invention relates to monoclonal antibodies specific for IL-20Rb and their use for therapeutic purposes in particular for the treatment of AE-COPD.

DETAILED DESCRIPTION OF THE INVENTION

The present invention relates to antibodies that are specific for IL-20Rb and binds to the extracellular domain of IL-20Rb.

As used herein, the term "IL-20 cytokines" has its general meaning in the art and refers to a subgroup in the IL-10 cytokine family which comprises IL-19 (Exemplary Human NCBI Reference Sequence: NP_715639.1), IL-20 (Exemplary Human NCBI Reference Sequence: NP_061194.2) and IL-24 (Exemplary Human NCBI Reference Sequence: NP_006841.1). IL-20 cytokines are very close to IL-22 and belong to the same subgroup of IL-10 cytokine family. IL-19, IL-20 and IL-24 (asthma et BPCO) act via a receptor complex that consists of the IL-20Ra and IL-20Rb chains present on epithelial, antigen-presenting cells, some lymphocytes and granulocytes. IL-20 and IL-24 are additionally able to signal via a second receptor complex (IL-22Ra/IL-20Rb).

As used herein, the term "IL-20Rb" has its general meaning in the art and refers to the interleukin-20 receptor subunit beta. An exemplary human amino acid sequence of IL-20Rb is represented by SEQ ID NO:1. The extracellular domain of IL-20-RB consists of the amino acid sequence that ranges from the residue at position 30 to the amino acid residue at position 233 in SEQ ID NO:1.

```
>sp|Q6UXL0|I20RB_HUMAN Interleukin-20 receptor
subunit
beta OS = Homo sapiens OX = 9606 GN = IL20RB
PE = 1 SV = 1
                                         SEQ ID NO: 1
MQTFTMVLEEIWTSLFMWFFYALIPCLLTDEVAILPAPQNLSVLSTNMK

HLLMWSPVIAPGETVYYSVEYQGEYESLYTSHIWIPSSWCSLTEGPECD

VTDDITATVPYNLRVRATLGSQTSAWSILKHPFNRNSTILTRPGMEITK

DGFHLVIELEDLGPQFEFLVAYWRREPGAEEHVKMVRSGGIPVHLETME

PGAAYCVKAQTFVKAIGRYSAFSQTECVEVQGEAIPLVLALFAFVGFML

ILVVVPLFVWKMGRLLQYSCCPVVVLPDTLKITNSPQKLISCRREEVDA

CATAVMSPEELLRAWIS
```

As used herein the term "antibody" or "immunoglobulin" have the same meaning, and will be used equally in the present invention. The term "antibody" as used herein refers to immunoglobulin molecules and immunologically active portions of immunoglobulin molecules, i.e., molecules that contain an antigen binding site that immunospecifically binds an antigen. As such, the term antibody encompasses not only whole antibody molecules, but also antibody fragments as well as variants (including derivatives) of antibodies and antibody fragments. In natural antibodies, two heavy chains are linked to each other by disulfide bonds and each heavy chain is linked to a light chain by a disulfide bond. There are two types of light chain, lambda (l) and kappa (κ). There are five main heavy chain classes (or isotypes) which determine the functional activity of an antibody molecule: IgM, IgD, IgG, IgA and IgE. Each chain contains distinct sequence domains. The light chain includes two domains, a variable domain (VL) and a constant domain (CL). The heavy chain includes four (α, δ, γ) to five (μ, ε) domains, a variable domain (VH) and three to four constant domains (CH1, CH2, CH3 and CH4 collectively referred to as CH). The variable regions of both light (VL) and heavy (VH) chains determine binding recognition and specificity to the antigen. The constant region domains of the light (CL) and heavy (CH) chains confer important biological properties such as antibody chain association, secretion, trans-placental mobility, complement binding, and binding to Fc receptors (FcR). The Fv fragment is the N-terminal part of the Fab fragment of an immunoglobulin and consists of the variable portions of one light chain and one heavy chain. The specificity of the antibody resides in the structural complementarity between the antibody combining site and the antigenic determinant. Antibody combining sites are made up of residues that are primarily from the hypervariable or complementarity determining regions (CDRs). Occasionally, residues from nonhypervariable or framework regions (FR) can participate to the antibody binding site or influence the overall domain structure and hence the combining site. CDRs refer to amino acid sequences which together define the binding affinity and specificity of the natural Fv region of a native immunoglobulin binding site. The light and heavy chains of an immunoglobulin each have three CDRs, designated L-CDR1, L-CDR2, L-CDR3 and H-CDR1, H-CDR2, H-CDR3, respectively. An antigen-binding site, therefore, typically includes six CDRs, comprising the CDR set from each of a heavy and a light chain V region. Framework Regions (FRs) refer to amino acid sequences interposed between CDRs. The residues in antibody variable domains are conventionally numbered according to a system devised by Kabat et al. This system is set forth in Kabat et al., 1987, in Sequences of Proteins of Immunological Interest, US Department of Health and Human Services, NIH, USA (hereafter "Kabat et al."). This numbering system is used in the present specification. The Kabat residue designations do not always correspond directly with the linear numbering of the amino acid residues in SEQ ID sequences. The actual linear amino acid sequence may contain fewer or additional amino acids than in the strict Kabat numbering corresponding to a shortening of, or insertion into, a structural component, whether framework or complementarity determining region (CDR), of the basic variable domain structure. The correct Kabat numbering of residues may be determined for a given antibody by alignment of residues of homology in the sequence of the antibody with a "standard" Kabat numbered sequence. The CDRs of the heavy chain variable domain are located at residues 31-35B (VH-CDR1), residues 50-65 (VH-CDR2) and residues 95-102 (VH-CDR3) according to the Kabat numbering system. The CDRs of the light chain variable domain are located at residues 24-34 (VL-CDR1), residues 50-56 (VL-CDR2) and residues 89-97 (VL-CDR3) according to the Kabat numbering system.

As used herein, the terms "monoclonal antibody", "monoclonal Ab", "monoclonal antibody composition", "mAb", or the like, as used herein refer to a preparation of antibody molecules of single molecular composition. A monoclonal antibody composition displays a single binding specificity and affinity for a particular epitope. Accordingly, the term "human monoclonal antibody" refers to antibodies displaying a single binding specificity which have variable and constant regions derived from human germline immunoglobulin sequences.

In some embodiments, the antibody of the present invention is an antibody molecule selected from the group consisting of a whole antibody, a Fv, a scFv, a Fab, a F(ab)'2, a defucosylated antibody, or a bi-specific antibody.

As used herein, a "whole antibody" or an "intact antibody" is one which comprises an antigen-binding site as well as a CL and at least heavy chain constant domains, CH1, CH2 and CH3. The constant domains may be native sequence constant domains (e.g., human native sequence constant domains) or amino acid sequence variants thereof.

As used herein, the term "antibody fragment" refers to at least one portion of an intact antibody, preferably the antigen binding region or variable region of the intact antibody, that retains the ability to specifically interact with (e.g., by binding, steric hindrance, stabilizing/destabilizing, spatial distribution) an epitope of an antigen. Examples of antibody fragments include, but are not limited to, Fab, Fab', F(ab')$_2$, Fv fragments, single chain antibody molecules, in particular scFv antibody fragments, disulfide-linked Fvs (sdFv), a Fd fragment consisting of the VH and CHI domains, linear antibodies, single domain antibodies such as, for example, sdAb (either VL or VH), camelid VHH domains, multi-specific antibodies formed from antibody fragments such as, for example, a bivalent fragment comprising two Fab fragments linked by a disulfide bridge at the hinge region, and an isolated CDR or other epitope binding fragments of an antibody. An antigen binding fragment can also be incorporated into single domain antibodies, maxibodies, minibodies, nanobodies, intrabodies, diabodies, triabodies, tetrabodies, v-NAR and bis-scFv (see, e.g., Hollinger and Hudson, Nature Biotechnology 23:1126-1136, 2005). Antigen binding fragments can also be grafted into scaffolds based on polypeptides such as a fibronectin type III (see U.S. Pat. No. 6,703,199, which describes fibronectin polypeptide minibodies). Papain digestion of antibodies produces two identical antigen-binding fragments, called "Fab" fragments, and a residual "Fc" fragment, a designation reflecting the ability to crystallize readily.

As used herein, a "functional fragment or analog of an antibody" is a compound having qualitative biological activity in common with a full-length antibody. For example, a functional fragment or analog of an anti-IgE antibody is one that can bind to an IgE immunoglobulin in such a manner so as to prevent or substantially reduce the ability of such molecule from having the ability to bind to the high affinity receptor, Fc[epsilon]RI.

"Fv" is the minimum antibody fragment that contains a complete antigen-recognition and -binding site. This fragment consists of a dimer of one heavy- and one light-chain variable region domain in tight, non-covalent association. From the folding of these two domains emanate six hypervariable loops (three loops each from the H and L chain) that contribute the amino acid residues for antigen binding and confer antigen binding specificity to the antibody. However, even a single variable domain (or half of an Fv comprising only three CDRs specific for an antigen) has the ability to recognize and bind antigen, although at a lower affinity than the entire binding site.

Fragments and derivatives of antibodies of this invention (which are encompassed by the term "antibody" as used in this application, unless otherwise stated or clearly contradicted by context), can be produced by techniques that are known in the art. "Fragments" comprise a portion of the intact antibody, generally the antigen binding site or variable region. Examples of antibody fragments include Fab, Fab', Fab'-SH, F(ab')$_2$, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide"), including without limitation (1) single-chain Fv molecules (2) single chain polypeptides containing only one light chain variable domain, or a fragment thereof that contains the three CDRs of the light chain variable domain, without an associated heavy chain moiety and (3) single chain polypeptides containing only one heavy chain variable region, or a fragment thereof containing the three CDRs of the heavy chain variable region, without an associated light chain moiety; and multispecific antibodies formed from antibody fragments. Fragments of the present antibodies can be obtained using standard methods. For instance, Fab or F(ab')2 fragments may be produced by protease digestion of the isolated antibodies, according to conventional techniques. It will be appreciated that immunoreactive fragments can be modified using known methods, for example to slow clearance in vivo and obtain a more desirable pharmacokinetic profile the fragment may be modified with polyethylene glycol (PEG). Methods for coupling and site-specifically conjugating PEG to a Fab' fragment are described in, for example, Leong et al., Cytokines 16 (3): 106-119 (2001) and Delgado et al., Br. J. Cancer 5 73 (2): 175-182 (1996), the disclosures of which are incorporated herein by reference.

In some embodiments, the antibody of the present invention is a chimeric antibody, a humanized antibody or a human antibody.

As used herein, the term "chimeric antibody" refers to an antibody which comprises a VH domain and a VL domain of a non-human antibody, and a CH domain and a CL domain of a human antibody. In some embodiments, a "chimeric antibody" is an antibody molecule in which (a) the constant region (i.e., the heavy and/or light chain), or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity. Chimeric antibodies also include primatized and in particular humanized antibodies. Furthermore, chimeric antibodies may comprise residues that are not found in the recipient antibody or in the donor antibody. These modifications are made to further refine antibody performance. For further details, see Jones et al., Nature 321:522-525 (1986); Riechmann et al., Nature 332:323-329 (1988); and Presta, Curr. Op. Struct. Biol. 2:593-596 (1992). (see U.S. Pat. No. 4,816,567; and Morrison et al., Proc. Natl. Acad. Sci. USA, 81:6851-6855 (1984)).

As used hereon, the term "humanized antibody" refers to an antibody having variable region framework and constant regions from a human antibody but retains the CDRs of a previous non-human antibody. In some embodiments, a humanized antibody contains minimal sequence derived from non-human immunoglobulin. For the most part, humanized antibodies and antibody fragments thereof may be human immunoglobulins (recipient antibody or antibody fragment) in which residues from a complementary-determining region (CDR) of the recipient are replaced by residues from a CDR of a non-human species (donor antibody) such as mouse, rat or rabbit having the desired specificity, affinity, and capacity. In some instances, Fv framework region (FR) residues of the human immunoglobulin are replaced by corresponding non-human residues. Furthermore, a humanized antibody/antibody fragment can comprise residues which are found neither in the recipient antibody nor in the imported CDR or framework sequences. Such antibodies are designed to maintain the binding specificity of the non-human antibody from which the binding regions are derived, but to avoid an immune reaction against the non-human antibody. These modifications can further refine and optimize antibody or antibody fragment performance. In general, the humanized antibody or antibody fragment thereof will comprise substantially all of at least one, and typically two, variable domains, in which all or substantially all of the CDR regions correspond to those of a non-human immunoglobulin and all or a significant portion of the FR regions are those of a human immunoglobulin sequence. The humanized antibody or antibody fragment can also comprise at least a portion of an immunoglobulin constant region (Fc), typically that of a human immunoglobulin. For further details, see Jones et al., Nature, 321: 522-525, 1986; Reichmann et al., Nature, 332: 323-329, 1988; Presta, Curr. Op. Struct. Biol., 2: 593-596, 1992.

As used herein the term "human monoclonal antibody", is intended to include antibodies having variable and constant regions derived from human immunoglobulin sequences. The human antibodies of the present invention may include amino acid residues not encoded by human immunoglobulin sequences (e.g., mutations introduced by random or site-specific mutagenesis in vitro or by somatic mutation in vivo). However, in some embodiments, the term "human monoclonal antibody", as used herein, is not intended to include antibodies in which CDR sequences derived from the germline of another mammalian species, such as a mouse, have been grafted onto human framework sequences.

In some embodiments, the antibody of the present invention is isolated. As used herein, an "isolated antibody" is one that has been separated and/or recovered from a component of its natural environment. Contaminant components of its natural environment are materials that may interfere with diagnostic or therapeutic uses of the antibody, and may include enzymes, hormones, and other proteinaceous or non-proteinaceous components. In preferred embodiments, the antibody is purified: (1) to greater than 95% by weight of antibody as determined by the Lowry method, and most preferably more than 99% by weight; (2) to a degree sufficient to obtain at least 15 residues of N-terminal or internal amino acid sequence by use of a spinning cup sequenator; or (3) to homogeneity as shown by SDS-PAGE under reducing or non-reducing conditions and using Coomassie blue or, preferably, silver staining. Isolated antibody includes the antibody in situ within recombinant cells since at least one component of the antibody's natural environment will not be present. Ordinarily, however, isolated antibody will be prepared by at least one purification step.

As used herein, the term "binding" refers to a direct association between two molecules, due to, for example, covalent, electrostatic, hydrophobic, and ionic and/or hydrogen-bond interactions, including interactions such as salt bridges and water bridges. In particular, as used herein, the term "binding" in the context of the binding of an antibody to a predetermined antigen or epitope typically is a binding with an affinity corresponding to a $K_D$ of about $10^{-7}$ M or less, such as about $10^{-8}$ M or less, such as about $10^{-9}$ M or less, about $10^{-10}$ M or less, or about $10^{-11}$ M or even less. Methods for measuring the $K_D$ of an antibody are well known in the art and include, without limitation, surface plasmon resonance (SPR) technology in a BIAcore 3000 instrument using a soluble form of the antigen as the ligand and the antibody as the analyte. BIACORE® (GE Healthcare, Piscaataway, NJ) is one of a variety of surface plasmon resonance assay formats that are routinely used to epitope bin panels of monoclonal antibodies. Affinities of antibodies can be readily determined using other conventional techniques, for example, those described by Scatchard et al., (Ann. N.Y. Acad. Sci. USA 51:660 (1949)). Binding properties of an antibody to antigens, cells or tissues may generally be determined and assessed using immunodetection methods including, for example, immunofluorescence-based assays, such as immunohistochemistry (IHC) and/or fluorescence-activated cell sorting (FACS). Typically, an antibody binds to the predetermined antigen with an affinity corresponding to a $K_D$ that is at least ten-fold lower, such as at least 100-fold lower, for instance at least 1,000-fold lower, such as at least 10,000-fold lower, for instance at least 100,000-fold lower than its $K_D$ for binding to a non-specific antigen (e.g., BSA, casein), which is not identical or closely related to the predetermined antigen. When the $K_D$ of the antibody is very low (that is, the antibody has a high affinity), then the $K_D$ with which it binds the antigen is typically at least 10,000-fold lower than its $K_D$ for a non-specific antigen. An antibody is said to essentially not bind an antigen or epitope if such binding is either not detectable (using, for example, plasmon resonance (SPR) technology in a BIAcore 3000 instrument using a soluble form of the antigen as the ligand and the antibody as the analyte), or is 100 fold, 500 fold, 1000 fold or more than 1000 fold less than the binding detected by that antibody and an antigen or epitope having a different chemical structure or amino acid sequence.

As used herein, the term "specificity" refers to the ability of an antibody to detectably bind an epitope presented on an antigen, such as IL-20Rb, while having relatively little detectable reactivity with non-IL-20Rb proteins. In particular, the antibody of the present invention has no specificity for IL-20Ra and IL-22Ra1. Specificity can be relatively determined by binding or competitive binding assays, using, e.g., Biacore instruments, as described elsewhere herein. Specificity can be exhibited by, e.g., an about 10:1, about 20:1, about 50:1, about 100:1, 10.000:1 or greater ratio of affinity/avidity in binding to the specific antigen versus nonspecific binding to other irrelevant molecules (in this case the specific antigen is a IL-20Rb polypeptide). The term "affinity", as used herein, means the strength of the binding of an antibody to an epitope. The affinity of an antibody is given by the dissociation constant Kd, defined as [Ab]×[Ag]/[Ab–Ag], where [Ab–Ag] is the molar concentration of the antibody-antigen complex, [Ab] is the molar concentration of the unbound antibody and [Ag] is the molar concentration of the unbound antigen. The affinity constant Ka is defined by 1/Kd. Preferred methods for determining the affinity of mAbs can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One preferred and standard method well known in the art for determining the affinity of mAbs is the use of Biacore instruments.

In some embodiments, the monoclonal antibody of the present invention cross-competes for binding to IL-20Rb with the monoclonal antibody comprising a heavy chain comprising the following CDRs i) the VH-CDR1 as set forth in SEQ ID NO:2 (NY-X3-MN wherein X3 is S or A), ii) the VH-CDR2 as set forth in SEQ ID NO:3 (YISGSSRYISY-ADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

In some embodiments, the monoclonal antibody of the present invention cross-competes for binding to IL-20Rb with the monoclonal antibody comprising a heavy chain comprising the following CDRs i) the VH-CDR1 as set forth in SEQ ID NO:8 (NYSMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGG-NYYVS), ii) the VL-CDR2 as set forth in SEQ ID NO:6 (GDSYRPS) and iii) the VL-CDR3 as set forth in SEQ ID NO:7 (SSYTYYSTRV).

In some embodiments, the monoclonal antibody of the present invention cross-competes for binding to IL-20Rb with the monoclonal antibody comprising a heavy chain comprising the following CDRs i) the VH-CDR1 as set forth in SEQ ID NO:9 (NYAMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGG-NYYVS), ii) the VL-CDR2 as set forth in SEQ ID NO:6 (GDSYRPS) and iii) the VL-CDR3 as set forth in SEQ ID NO:7 (SSYTYYSTRV).

As used herein, the term "cross-competes" refers to monoclonal antibodies which share the ability to bind to a specific region of an antigen. In the present disclosure the monoclonal antibody that "cross-competes" has the ability to interfere with the binding of another monoclonal antibody for the antigen in a standard competitive binding assay. Such a monoclonal antibody may, according to non-limiting theory, bind to the same or a related or nearby (e.g., a structurally similar or spatially proximal) epitope as the antibody with which it competes. Cross-competition is present if antibody A reduces binding of antibody B at least by 60%, specifically at least by 70% and more specifically at least by 80% and vice versa in comparison to the positive control which lacks one of said antibodies. As the skilled artisan appreciates competition may be assessed in different assay set-ups. One suitable assay involves the use of the Biacore technology (e.g., by using the BIAcore 3000 instrument (Biacore, Uppsala, Sweden)), which can measure the extent of interactions using surface plasmon resonance technology. Another assay for measuring cross-competition uses an ELISA-based approach. Furthermore, a high throughput process for "binning" antibodies based upon their cross-competition is described in International Patent Application No. WO2003/48731.

In some embodiment, the antibody of the invention comprises a heavy chain comprising the following CDRs i) the VH-CDR1 as set forth in SEQ ID NO:2 (NY-X3-MN wherein X3 is S or A), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

In some embodiments, the monoclonal antibody of the present invention comprises a heavy chain comprising the following CDRs i) the VH-CDR1 as set forth in SEQ ID NO:8 (NYSMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

In some embodiments, the monoclonal antibody of the present invention comprises a heavy chain comprising the following CDRs i) the VH-CDR1 as set forth in SEQ ID NO:9 (NYAMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

In some embodiments, the antibody of the present invention comprises a heavy chain having 70% of identity with SEQ ID NO:10 or SEQ ID NO:11 and/or a light chain having 70% of identity with SEQ ID NO:12.

```
SEQ ID NO: 10: heavy chain of the B7 antibody

FR1-CDR1-FR2-CDR2-FR3-CDR3-FR4

EVQLVESGGSLVKPGGSLRLSCAASGFTFS NYSMN

WVRQAPGKGLEWIS YISGSSRYISYADFVKG

RFTISRDNATNSLYLQMNSLRAEDTAVYYCVR SYYGMDV

WGRGTLVTVSS

SEQ ID NO: 11 heavy chain of the B7mut antibody

FR1-CDR1-FR2-CDR2-FR3-CDR3-FR4

EVQLVESGGSLVKPGGSLRLSCAASGFTFS NYAMN

WVRQAPGKGLEWIS YISGSSRYISYADFVKG

RFTISRDNAKNSLYLQMNSLRAEDTAVYYCVR SYYGMDV

WGRGTLVTVSS
```

```
-continued
SEQ ID NO: 12: light chain of the B7 or B7mut
antibody

FR1-CDR1-FR2-CDR2-FR3-CDR3-FR4

QSVLTQPASVSGSPGQSITISC AGTSSDVGGNYYVS

WYQQHPGKAPKLMIY GDSYRPS

GVSNRFSGSKSGNTASLTISGLQAEDEADYYC SSYTYYSTRV

FGGGTKLAVLG
```

According to the invention, a first amino acid sequence having at least 70% of identity with a second amino acid sequence means that the first sequence has 70; 71; 72; 73; 74; 75; 76; 77; 78; 79; 80; 81; 82; 83; 84; 85; 86; 87; 88; 89; 90; 91; 92; 93; 94; 95; 96; 97; 98; 99 or 100% of identity with the second amino acid sequence. Sequence identity is frequently measured in terms of percentage identity (or similarity or homology); the higher the percentage, the more similar are the two sequences. Methods of alignment of sequences for comparison are well known in the art. Various programs and alignment algorithms are described in: Smith and Waterman, Adv. Appl. Math., 2:482, 1981; Needleman and Wunsch, J. Mol. Biol., 48:443, 1970; Pearson and Lipman, Proc. Natl. Acad. Sci. U.S.A., 85:2444, 1988; Higgins and Sharp, Gene, 73:237-244, 1988; Higgins and Sharp, CABIOS, 5:151-153, 1989; Corpet et al. Nuc. Acids Res., 16:10881-10890, 1988; Huang et al., Comp. Appls Biosci., 8:155-165, 1992; and Pearson et al., Meth. Mol. Biol., 24:307-31, 1994). Altschul et al., Nat. Genet., 6:119-129, 1994, presents a detailed consideration of sequence alignment methods and homology calculations. By way of example, the alignment tools ALIGN (Myers and Miller, CABIOS 4:11-17, 1989) or LFASTA (Pearson and Lipman, 1988) may be used to perform sequence comparisons (Internet Program® 1996, W. R. Pearson and the University of Virginia, fasta20u63 version 2.0u63, release date December 1996). ALIGN compares entire sequences against one another, while LFASTA compares regions of local similarity. These alignment tools and their respective tutorials are available on the Internet at the NCSA Website, for instance. Alternatively, for comparisons of amino acid sequences of greater than about 30 amino acids, the Blast 2 sequences function can be employed using the default BLOSUM62 matrix set to default parameters, (gap existence cost of 11, and a per residue gap cost of 1). When aligning short peptides (fewer than around 30 amino acids), the alignment should be performed using the Blast 2 sequences function, employing the PAM30 matrix set to default parameters (open gap 9, extension gap 1 penalties). The BLAST sequence comparison system is available, for instance, from the NCBI web site; see also Altschul et al., J. Mol. Biol., 215:403-410, 1990; Gish. & States, Nature Genet., 3:266-272, 1993; Madden et al. Meth. Enzymol., 266:131-141, 1996; Altschul et al., Nucleic Acids Res., 25:3389-3402, 1997; and Zhang & Madden, Genome Res., 7:649-656, 1997.

In some embodiments, the heavy chain and/or the light chain of the antibody of the invention comprises conservative sequence modifications. The term "conservative sequence modifications" refers to amino acid modifications that do not significantly affect or alter the biologic function of the protein containing the amino acid sequence. Such conservative modifications include amino acid substitutions, additions and deletions. Modifications can be introduced into a protein by standard techniques known in the art, such as site-directed mutagenesis and PCR-mediated mutagenesis. A "conservative substitution" is one in which an amino acid is substituted for another amino acid that has similar properties, such that one skilled in the art of peptide chemistry would expect the secondary structure and hydropathic nature of the polypeptide to be substantially unchanged. Amino acid substitutions are generally therefore based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include: arginine and lysine; glutamate and aspartate; serine and threonine; glutamine and asparagine; and valine, leucine and isoleucine. Amino acid substitutions may further be made on the basis of similarity in polarity, charge, solubility, hydrophobicity, hydrophilicity and/or the amphipathic nature of the residues. For example, negatively charged amino acids include aspartic acid and glutamic acid; positively charged amino acids include lysine and arginine; and amino acids with uncharged polar head groups having similar hydrophilicity values include leucine, isoleucine and valine; glycine and alanine; asparagine and glutamine; and serine, threonine, phenylalanine and tyrosine. Other groups of amino acids that may represent conservative changes include: (1) ala, pro, gly, glu, asp, gln, asn, ser, thr; (2) cys, ser, tyr, thr; (3) val, ile, leu, met, ala, phe; (4) lys, arg, his; and (5) phe, tyr, trp, his. Other families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within an antibody of the invention can be replaced with other amino acid residues from the same side chain family and the altered antibody can be tested for binding to IL-20Rb.

In some embodiments, the antibody of the present invention comprises the heavy chain as set forth in SEQ ID NO:10 or SEQ ID NO:11 and the light chain as set forth in SEQ ID NO:12.

In some embodiments, the antibody (preferably the monoclonal antibody) of the present invention does not comprise a Fc region that mediates antibody-dependent cell-mediated cytotoxicity and thus does not comprise an Fc portion that induces antibody dependent cellular cytotoxicity (ADCC). In some embodiments, the antibody (preferably the monoclonal antibody) of the present invention does not comprise an Fc region that induces complement dependent cytotoxicity (CDC) or antibody-dependent phagocytosis. In some embodiments the antibody (preferably the monoclonal antibody) of the present invention does not lead, directly or indirectly, to the depletion of cells expressing IL-20Rb polypeptides (e.g., do not lead to a 10%, 20%, 50%, 60% or greater elimination or decrease in number of IL-20Rb$^+$ Cells). In some embodiments, the antibody (preferably the monoclonal antibody) of the present invention does not comprise an Fc domain capable of substantially binding to a FcγRIIIA (CD16) polypeptide. In some embodiments, the antibody (preferably the monoclonal antibody) of the present invention lacks an Fc domain (e.g., lacks a CH2 and/or CH3 domain) or comprises an Fc domain of IgG2 or IgG4 isotype. In some embodiments, the antibody (preferably the monoclonal antibody) of the present invention comprises an Fc domain (e.g. of IgG1) with an altered glycosylation profile, resulting in the absence of ADCC activity of the antibody. In some embodiments, the antibody (preferably the monoclonal antibody) of the present invention consists of or comprises a Fab, Fab', Fab'-SH, F(ab')$_2$, Fv, a diabody, single-chain antibody fragment, or a multispecific antibody comprising multiple different antibody fragments. In some embodiments, the antibody (preferably the monoclonal antibody) of the present invention is not linked to a toxic moiety. In some embodiments, one or more amino acids selected from amino acid residues can be replaced with a different amino acid residue such that the antibody has altered C2q binding and/or reduced or abolished CDC. This approach is described in further detail in U.S. Pat. No. 6,194,551 by Idusogie et al.

As used herein "Fe region" includes the polypeptides comprising the constant region of an antibody excluding the first constant region immunoglobulin domain. Thus, Fc refers to the last two constant region immunoglobulin domains of IgA, IgD, and IgG, and the last three constant region immunoglobulin domains of IgE and IgM, and the flexible hinge N-terminal to these domains. For IgA and IgM Fc may include the J chain. For IgG, Fc comprises immunoglobulin domains Cgamma2 and Cgamma3 (Cγ2 and Cγ3) and the hinge between Cgamma1 (Cγ1) and Cgamma2 (Cγ2). Although the boundaries of the Fc region may vary, the human IgG heavy chain Fc region is usually defined to comprise residues C226 or P230 to its carboxyl-terminus, wherein the numbering is according to the EU index as in Kabat et al. (1991, NIH Publication 91-3242, National Technical Information Service, Springfield, Va.). The "EU index as set forth in Kabat" refers to the residue numbering of the human IgG1 EU antibody as described in Kabat et al. supra. Fc may refer to this region in isolation, or this region in the context of an antibody, antibody fragment, or Fc fusion protein. An Fc variant protein may be an antibody, Fc fusion, or any protein or protein domain that comprises an Fc region. Particularly preferred are proteins comprising variant Fc regions, which are non-naturally occurring variants of an Fc region. The amino acid sequence of a non-naturally occurring Fc region (also referred to herein as a "variant Fc region") comprises a substitution, insertion and/or deletion of at least one amino acid residue compared to the wild type amino acid sequence. Any new amino acid residue appearing in the sequence of a variant Fc region as a result of an insertion or substitution may be referred to as a non-naturally occurring amino acid residue. Note: Polymorphisms have been observed at a number of Fc positions, including but not limited to Kabat 270, 272, 312, 315, 356, and 358, and thus slight differences between the presented sequence and sequences in the prior art may exist.

The terms "Fe receptor" or "FcR" are used to describe a receptor that binds to the Fc region of an antibody. The primary cells for mediating ADCC, Cells, express FcγRIII, whereas monocytes express FcγRI, FcγRII, FcγRIII and/or FcγRIV. FcR expression on hematopoietic cells is summarized in Ravetch and Kinet, Annu. Rev. Immunol., 9:457-92 (1991). To assess ADCC activity of a molecule, an in vitro ADCC assay, such as that described in U.S. Pat. No. 5,500,362 or 5,821,337 may be performed. Useful effector cells for such assays include peripheral blood mononuclear cells (PBMC) and Natural Killer (NK) cells. Alternatively, or additionally, ADCC activity of the molecules of interest may be assessed in vivo, e.g., in an animal model such as that disclosed in Clynes et al., Proc. Natl. Acad. Sci. (USA), 95:652-656 (1998). As used herein, the term "effector cells" are leukocytes which express one or more FcRs and perform effector functions. The cells express at least FcγRI, FCγRII, FcγRIII and/or FcγRIV and carry out ADCC effector function. Examples of human leukocytes which mediate ADCC include peripheral blood mononuclear cells (PBMC), natural killer (NK) cells, monocytes, cytotoxic T cells and neutrophils.

The antibody of the present invention is produced by any technique known in the art, such as, without limitation, any chemical, biological, genetic or enzymatic technique, either alone or in combination. Typically, knowing the amino acid sequence of the desired sequence, one skilled in the art can readily produce said antibodies, by standard techniques for production of polypeptides. For instance, they can be synthesized using well-known solid phase method, preferably using a commercially available peptide synthesis apparatus (such as that made by Applied Biosystems, Foster City, California) and following the manufacturer's instructions. Alternatively, antibodies of the present invention can be synthesized by recombinant DNA techniques well-known in the art. For example, antibodies can be obtained as DNA expression products after incorporation of DNA sequences encoding the antibodies into expression vectors and introduction of such vectors into suitable eukaryotic or prokaryotic hosts that will express the desired antibodies, from which they can be later isolated using well-known techniques.

Accordingly, a further object of the invention relates to a nucleic acid molecule encoding an antibody according to the invention. More particularly the nucleic acid molecule encodes a heavy chain and/or a light chain of an antibody of the present invention.

As used herein, the term "encoding" refers to the inherent property of specific sequences of nucleotides in a polynucleotide, such as, for example, a gene, a cDNA, or an mRNA, to serve as templates for synthesis of other polymers and macromolecules in biological processes having either a defined sequence of nucleotides (e.g., rRNA, tRNA and mRNA) or a defined sequence of amino acids and the biological properties resulting therefrom. Thus, a gene, cDNA, or RNA, encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA. Unless otherwise specified, a "nucleotide sequence encoding an amino acid sequence" includes all nucleotide sequences that are degenerate versions of each other and that encode the same amino acid sequence. The phrase "nucleotide sequence that encodes a protein or a RNA" may also include introns to the extent that the nucleotide sequence encoding the protein may in some version contain an intron(s).

Typically, said nucleic acid is a DNA or RNA molecule, which may be included in any suitable vector, such as a plasmid, cosmid, episome, artificial chromosome, phage or a viral vector. As used herein, the terms "vector", "cloning vector" and "expression vector" mean the vehicle by which a DNA or RNA sequence (e.g., a foreign gene) can be introduced into a host cell, so as to transform the host and promote expression (e.g., transcription and translation) of the introduced sequence. So, a further object of the invention relates to a vector comprising a nucleic acid of the invention.

Such vectors may comprise regulatory elements, such as a promoter, enhancer, terminator and the like, to cause or direct expression of said antibody upon administration to a subject. Examples of promoters and enhancers used in the expression vector for animal cell include early promoter and enhancer of SV40, LTR promoter and enhancer of Moloney mouse leukemia virus, promoter and enhancer of immunoglobulin H chain and the like. Any expression vector for animal cell can be used, so long as a gene encoding the human antibody C region can be inserted and expressed. Examples of suitable vectors include pAGE107, pAGE103, pHSG274, pKCR, pSG1 beta d2-4 and the like. Other examples of plasmids include replicating plasmids comprising an origin of replication, or integrative plasmids, such as for instance pUC, pcDNA, pBR, and the like. Other examples of viral vector include adenoviral, retroviral, herpes virus and AAV vectors. Such recombinant viruses may be produced by techniques known in the art, such as by transfecting packaging cells or by transient transfection with helper plasmids or viruses. Typical examples of virus packaging cells include PA317 cells, PsiCRIP cells, GPenv+ cells, 293 cells, etc. Detailed protocols for producing such replication-defective recombinant viruses may be found for instance in WO 95/14785, WO 96/22378, U.S. Pat. Nos. 5,882,877, 6,013,516, 4,861,719, 5,278,056 and WO 94/19478.

As used herein, the term "promoter/regulatory sequence" refers to a nucleic acid sequence (such as, for example, a DNA sequence) recognized by the synthetic machinery of the cell, or introduced synthetic machinery, required to initiate the specific transcription of a polynucleotide sequence, thereby allowing the expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue specific manner.

As used herein, the term "operably linked" or "transcriptional control" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Operably linked DNA sequences can be contiguous with each other and, e.g., where necessary to join two protein coding regions, are in the same reading frame.

A further object of the present invention relates to a host cell which has been transfected, infected or transformed by a nucleic acid and/or a vector according to the invention. As used herein, the term "transformation" means the introduction of a "foreign" (i.e., extrinsic or extracellular) gene, DNA or RNA sequence to a host cell, so that the host cell will express the introduced gene or sequence to produce a desired substance, typically a protein or enzyme coded by the introduced gene or sequence. A host cell that receives and expresses introduced DNA or RNA bas been "transformed".

The nucleic acids of the invention may be used to produce an antibody of the present invention in a suitable expression system. The term "expression system" means a host cell and compatible vector under suitable conditions, e.g., for the expression of a protein coded for by foreign DNA carried by the vector and introduced to the host cell. Common expression systems include *E. coli* host cells and plasmid vectors, insect host cells and Baculovirus vectors, and mammalian host cells and vectors. Other examples of host cells include, without limitation, prokaryotic cells (such as bacteria) and eukaryotic cells (such as yeast cells, mammalian cells, insect cells, plant cells, etc.). Specific examples include *E. coli*, *Kluyveromyces* or *Saccharomyces* yeasts, mammalian cell lines (e.g., Vero cells, CHO cells, 3T3 cells, COS cells, etc.) as well as primary or established mammalian cell cultures (e.g., produced from lymphoblasts, fibroblasts, embryonic cells, epithelial cells, nervous cells, adipocytes, etc.). Examples also include mouse SP2/0-Ag14 cell (ATCC CRL1581), mouse P3X63-Ag8.653 cell (ATCC CRL1580), CHO cell in which a dihydrofolate reductase gene (hereinafter referred to as "DHFR gene") is defective (Urlaub G et al; 1980), rat YB2/3HL.P2.G11.16Ag.20 cell (ATCC CRL1662, hereinafter referred to as "YB2/0 cell"), and the like. The present invention also relates to a method of producing a recombinant host cell expressing an antibody according to the invention, said method comprising the steps of: (i) introducing in vitro or ex vivo a recombinant nucleic acid or a vector as described above into a competent host cell, (ii) culturing in vitro or ex vivo the recombinant host cell obtained and (iii), optionally, selecting the cells which express and/or secrete said antibody. Such recombinant host cells can be used for the production of antibodies of the present invention. Examples of vectors include all those known in the art, including, without limitation, cosmids, plasmids (e.g., naked or contained in liposomes) and viruses (e.g., lentiviruses, retroviruses, adenoviruses, and adeno-associated viruses) that incorporate the recombinant polynucleotide.

Antibodies of the present invention are suitably separated from the culture medium by conventional immunoglobulin purification procedures such as, for example, protein A-Sepharose, hydroxylapatite chromatography, gel electrophoresis, dialysis, or affinity chromatography.

Accordingly a further object of the present invention relates to the antibody of the present invention for use as a drug. More specifically, the present invention provides a method of therapy in a patient in need thereof, comprising administering to the patient a therapeutically effective amount of an antibody of the present invention.

In some embodiments, the antibody of the present invention is particularly suitable for the treatment of acute exacerbation of chronic obstructive pulmonary disease (AE-COPD).

As used herein, the expression "acute exacerbation of chronic obstructive pulmonary disease" or "AE-COPD" has its general meaning in the art and refers to worsening of a subject's COPD symptoms from his or her usual state that is beyond normal day-to-day variations, and is acute in onset. Typically, the acute exacerbation of COPD is manifested by one or more symptoms selected from worsening dyspnea, increased sputum production, increased sputum purulence, change in color of sputum, increased coughing, upper airway symptoms including colds and sore throats, increased wheezing, chest tightness, reduced exercise tolerance, fatigue, fluid retention, and acute confusion, and said method comprises reducing the frequency, severity or duration of one or more of said symptoms. Acute exacerbation may have various etiologies, but typically may be caused by viral infections, bacterial infections, or air pollution. For example, approximately 50% of acute exacerbations are due primarily to the bacteria *Streptococcus pneumoniae*, *Haemophilus influenzae*, and *Moraxella catarrhalis* (all of them causing pneumonia). Viral pathogens associated with acute exacerbations in subjects with COPD include rhinoviruses, influenza, parainfluenza, coronavirus, adenovirus, and respiratory syncytial virus.

In some embodiments, the acute exacerbation of COPD is caused by a bacterial infection. In some embodiments, the acute exacerbation of COPD is caused by a viral infection. In some embodiments, the acute exacerbation of COPD is caused by air pollution.

In some embodiments, the subject experienced an acute exacerbation of COPD or is at risk of experiencing an acute exacerbation of COPD. In some embodiments, the subject has experienced at least one acute exacerbation of COPD in the past 24 months. In one particular embodiment, the subject has experienced at least one acute exacerbation of COPD in the past 12 months. In some embodiments, subject is a frequent exacerbator. As used herein the term "frequent exacerbator" refers to a subject who suffers from or is undergoing treatment for COPD and who experiences at least 2, and more typically 3 or more, acute exacerbations during a 12 month period.

In some embodiments, "treating" refers to treating an acute exacerbation of COPD, reducing the frequency, duration or severity of an acute exacerbation of COPD, treating one or more symptoms of acute exacerbation of COPD, reducing the frequency, duration or severity of one or more symptoms of an acute exacerbation of COPD, preventing the incidence of acute exacerbation of COPD, or preventing the incidence of one or more symptoms of acute exacerbation of COPD, in a human. The reduction in frequency, duration or severity is relative to the frequency, duration or severity of an acute exacerbation or symptom in the same human not undergoing treatment according to the methods of the present invention. A reduction in frequency, duration or severity of acute exacerbation or one or more symptoms of acute exacerbation may be measured by clinical observation by an ordinarily skilled clinician with experience of treating COPD subjects or by subjective self-evaluations by the subject undergoing treatment. Clinical observations by an ordinarily skilled clinician may include objective measures of lung function, as well as the frequency with which intervention is required to maintain the subject in his or her most stable condition, and the frequency of hospital admission and length of hospital stay required to maintain the subject in his or her most stable condition. Typically, subjective self-evaluations by a subject are collected using industry-recognized and/or FDA-recognized subject reported outcome (PRO) tools. Such tools may allow the subject to evaluate specific symptoms or other subjective measures of quality of life. An example of one subject reported outcome tool is Exacerbations from Pulmonary Disease Tool (EXACT-PRO), which is currently being developed for evaluating clinical response in acute bacterial exacerbations by United BioSource Corporation along with a consortium of pharmaceutical industry sponsors in consultation with the FDA.

In some embodiments, the treatment is a prophylactic treatment. As used herein, the term "prophylactic treatment" refer to any medical or public health procedure whose purpose is to prevent a disease. As used herein, the terms "prevent", "prevention" and "preventing" refer to the reduction in the risk of acquiring or developing a given condition, or the reduction or inhibition of the recurrence or said condition in a subject who is not ill, but who has been or may be near a subject with the disease.

A further object of the present invention relates to a composition comprising, consisting of or consisting essentially of an antibody of the present invention.

As used herein, "consisting essentially of", with reference to a composition, means that the at least one antibody of the invention as described hereinabove is the only one therapeutic agent or agent with a biologic activity within said composition.

In some embodiments, the composition of the invention is a pharmaceutical composition and further comprises a pharmaceutically acceptable carrier.

The term "pharmaceutically acceptable carrier" refers to an excipient that does not produce an adverse, allergic or other untoward reaction when administered to an animal, preferably a human. It includes any and all solvents, dispersion media, coatings, antibacterial and antifungal agents, isotonic and absorption delaying agents and the like. For human administration, preparations should meet sterility, pyrogenicity, general safety and purity standards as required by regulatory offices, such as, for example, FDA Office or EMA. Pharmaceutically acceptable carriers that may be used in these compositions include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. For use in administration to a patient, the composition will be formulated for administration to the patient. The compositions of the present invention may be administered orally, parenterally, by inhalation spray, topically, rectally, nasally, buccally, vaginally or via an implanted reservoir. The used herein includes subcutaneous, intravenous, intramuscular, intra-articular, intra-synovial, intrasternal, intrathecal, intrahepatic, intralesional and intracranial injection or infusion techniques. Sterile injectable forms of the compositions of this invention may be aqueous or an oleaginous suspension. These suspensions may be formulated according to techniques known in the art using suitable dispersing or wetting agents and suspending agents. The sterile injectable preparation may also be a sterile injectable solution or suspension in a non-toxic parenterally acceptable diluent or solvent, for example as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers which are commonly used in the manufacture of pharmaceutically acceptable solid, liquid, or other dosage forms may also be used for the purposes of formulation. The compositions of this invention may be orally administered in any orally acceptable dosage form including, but not limited to, capsules, tablets, aqueous suspensions or solutions. In the case of tablets for oral use, carriers commonly used include lactose and corn starch. Lubricating agents, such as magnesium stearate, are also typically added. For oral administration in a capsule form, useful diluents include, e.g., lactose. When aqueous suspensions are required for oral use, the active ingredient is combined with emulsifying and suspending agents. If desired, certain sweetening, flavoring or coloring agents may also be added. Alternatively, the compositions of this invention may be administered in the form of suppositories for rectal administration. These can be prepared by mixing the agent with a suitable non-irritating excipient that is solid at room temperature but liquid at rectal temperature and therefore will melt in the rectum to release the drug. Such materials include cocoa butter, beeswax and polyethylene glycols. The compositions of this invention may also be administered topically, especially when the target of treatment includes areas or organs readily accessible by topical application, including diseases of the eye, the skin, or the lower intestinal tract. Suitable topical formulations are readily prepared for each of these areas or organs. For topical applications, the compositions may be formulated in a suitable ointment containing the active component suspended or dissolved in one or more carriers. Carriers for topical administration of the compounds of this invention include, but are not limited to, mineral oil, liquid petrolatum, white petrolatum, propylene glycol, polyoxyethylene, polyoxypropylene compound, emulsifying wax and water. Alternatively, the compositions can be formulated in a suitable lotion or cream containing the active components suspended or dissolved in one or more pharmaceutically acceptable carriers. Suitable carriers include, but are not limited to, mineral oil, sorbitan monostearate, polysorbate 60, cetyl esters wax, cetearyl alcohol, 2-octyldodecanol, benzyl alcohol and water. Topical application for the lower intestinal tract can be effected in a rectal suppository formulation (see above) or in a suitable enema formulation. Patches may also be used. The compositions of this invention may also be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other conventional solubilizing or dispersing agents. For example, an antibody present in a pharmaceutical composition of this invention can be supplied at a concentration of 10 mg/mL in either 100 mg (10 mL) or 500 mg (50 mL) single-use vials. The product is formulated for IV administration in 9.0 mg/mL sodium chloride, 7.35 mg/mL sodium citrate dihydrate, 0.7 mg/mL polysorbate 80, and Sterile Water for Injection. The pH is adjusted to 6.5. An exemplary suitable dosage range for an antibody in a pharmaceutical composition of this invention may between about 1 mg/m$^2$ and 500 mg/m$^2$. However, it will be appreciated that these schedules are exemplary and that an optimal schedule and regimen can be adapted taking into account the affinity and tolerability of the particular antibody in the pharmaceutical composition that must be determined in clinical trials. A pharmaceutical composition of the invention for injection (e.g., intramuscular, i.v.) could be prepared to contain sterile buffered water (e.g., 1 ml for intramuscular), and between about 1 ng to about 100 mg, e.g., about 50 ng to about 30 mg or more preferably, about 5 mg to about 25 mg, of an antibody of the invention.

The invention will be further illustrated by the following figures and examples. However, these examples and figures should not be interpreted in any way as limiting the scope of the present invention.

FIGURES

FIG. 1: Binding of the recombinant anti-IL-20Rb antibodies (native and mutated B7) produced as murine IgG2a to bind recombinant human IL-20Rb. The binding is compared with the rat anti-IL-20Rb monoclonal antibody (clone 20RNTC). The recombinant IL-20Rb protein is bound overnight at 4° C. to Nunc™ MaxiSorp plate at 1 µg/ml concentration in PBS. After saturation in PBS plus 10% fetal calf serum for 1 h, the antibodies were added at a concentration of 1 µg/ml for 2 h. After washings, the antibody binding was detected by addition of a biotinylated anti-murine IgG and then with streptavidin-HRP (Thermo Scientific™). The reaction is revealed by addition of the TMB substrate and the optical density was read at 495 nm. The results were expressed as the mean±SEM of the optical density.

FIG. 2: Competition between both anti-IL-20Rb antibodies: our human anti-IL-20RB antibody (B7) and the rat anti-IL-20Rb monoclonal antibody (clone 20RNTC). Both antibodies are labelled with a fluorochrome (APC, B7* and 20RNTC*) as well as the isotype control (Clone 13R4*). The binding of the B7* (A) and of 20RNTC* (B) (5 µg/ml) was evaluated on bone-marrow-derived dendritic cell (BMDC) in presence of unlabeled antibodies (either B7, 20RNTC and the control 13R4) at different concentrations (5, 10 and 20 µg/ml). The results were expressed as the percentage of positive cells based on the isotype control (13R4) and this is the mean±SEM of 2 independent experiments.

Figure 3:
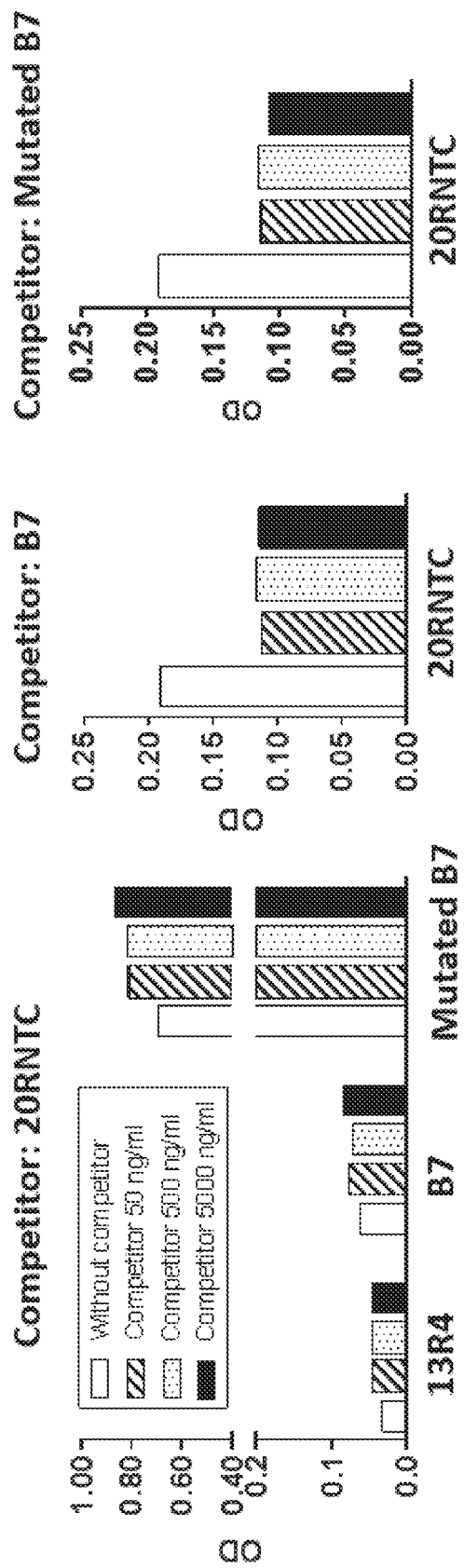

FIG. 3: Competition between the anti-IL-20Rb antibodies: our human anti-IL-20RB antibody (B7), the mutated form of this antibody (Mutated B7) and the rat anti-IL-20Rb monoclonal antibody (clone 20RNTC). ELISA plates were coated with recombinant IL-20RB (1 µg/ml). The binding of each antibody was evaluated in presence or not of a competitor at different concentrations (50, 500 and 5000 ng/ml of 20RNTC, B7 and mutated B7). The binding of the B7 and the 20RNTC antibodies were detected with a biotinylated anti-mouse or an anti-rat IgG antibody, respectively. This binding was revealed by addition of HRP-conjugated streptavidin followed by addition of the substrate TMB. The results were expressed as the optical density (OD).

Figure 4:
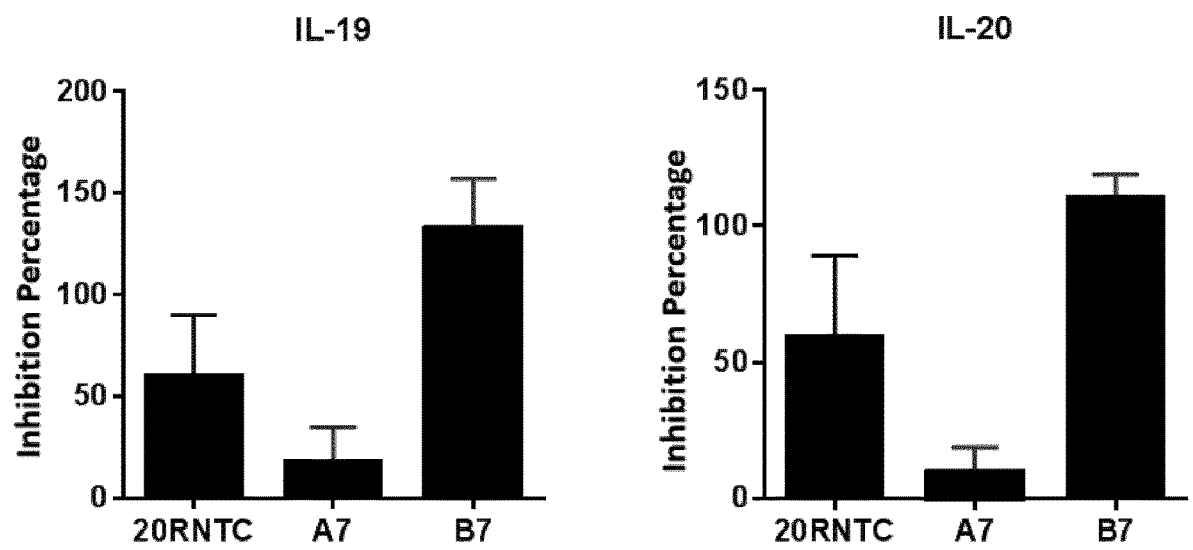

FIG. 4: Capacity of the anti-IL-20Rb antibodies including the 20RNTC, the A7 and the B7 clones to inhibit the response to IL-20 cytokines on human airway epithelial cells (the BEAS-2B cell line). BEAS-2B cells were cultivated until confluence in complete airway epithelial cell culture medium (Promo-Cell®) in 24 wells plate (Thermo Scientific™). After overnight starvation of the confluent cells in the same medium without growth factors, BEAS-2B cells were preincubated with the different antibodies (5 µg/ml) before stimulation with IL-19 or IL-20 (Bio-Techne®, 20 ng/ml). The production of CXCL1 was evaluated by ELISA in cell supernatants collected after 24 h incubation (Bio-Techne®, UK) and the results were expressed as a percentage of inhibition where 0% corresponds to the cells with the cytokine plus an isotype control and 100% inhibition to the level obtained in unstimulated cells. The results were expressed as mean±SEM (n=3).

Figure 5:
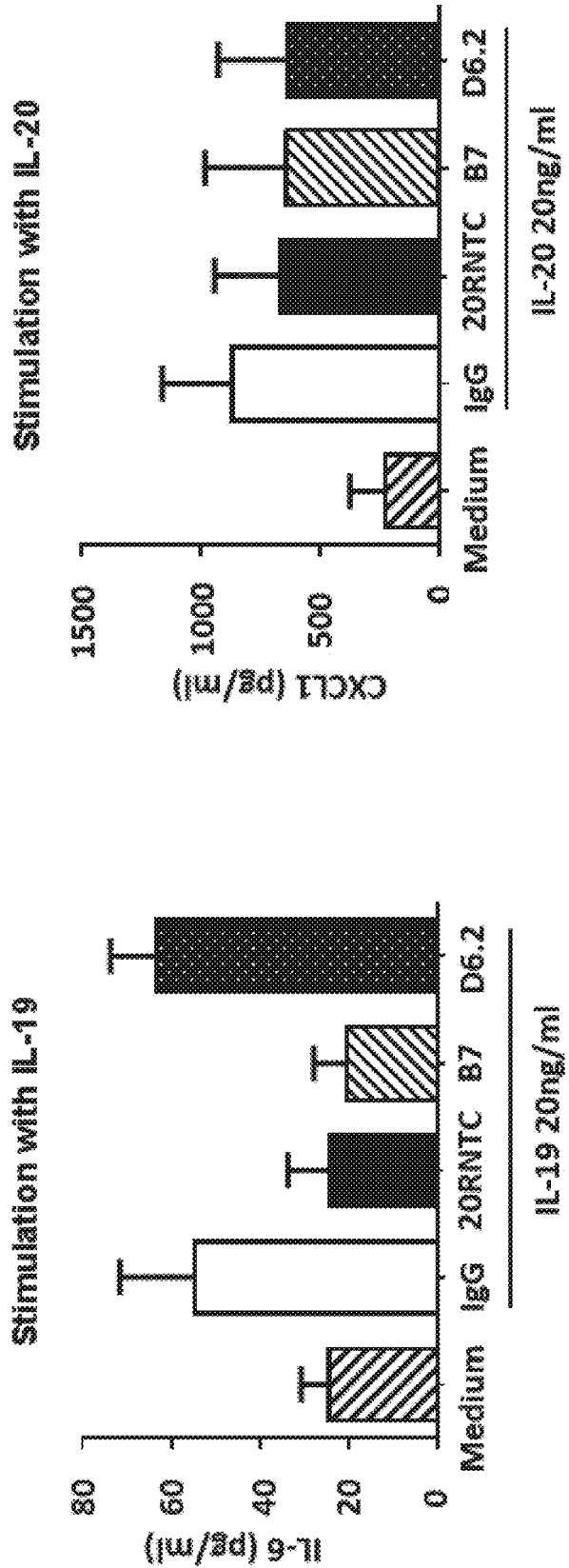

FIG. 5: Capacity of the anti-IL-20Rb antibodies including the 20RNTC, the A7 and the B7 clones to inhibit the response to IL-20 cytokines on murine tracheal epithelial cells (primary cultures). After enzymatic digestion of the trachea with pronase (1.6 mg/ml) during 1 hour, the tracheal epithelial cells were cultivated until confluence in DMEM-F12 medium (Invitrogen) supplemented with 2% Ultroser™ G serum substitute (Pall Lab.) plus antibiotics in 24 wells plate (Thermo Scientific™). After overnight starvation of the confluent cells in the same medium without Ultroser™ G serum substitute, tracheal cells were preincubated with the different antibodies (an isotype control (IgG) and the anti-IL-20Rb antibodies our B7 and D6.2 clones and the 20RNTC monoclonal antibody (5 µg/ml)) before stimulation with IL-19 or IL-20 (Bio-Techne™, 20 ng/ml). The production of IL-6 and CXCL1 was evaluated by ELISA in cell supernatants collected after 24 h incubation (Bio-Techne™, UK). The results were expressed as mean±SEM (n=3).

Figure 6:
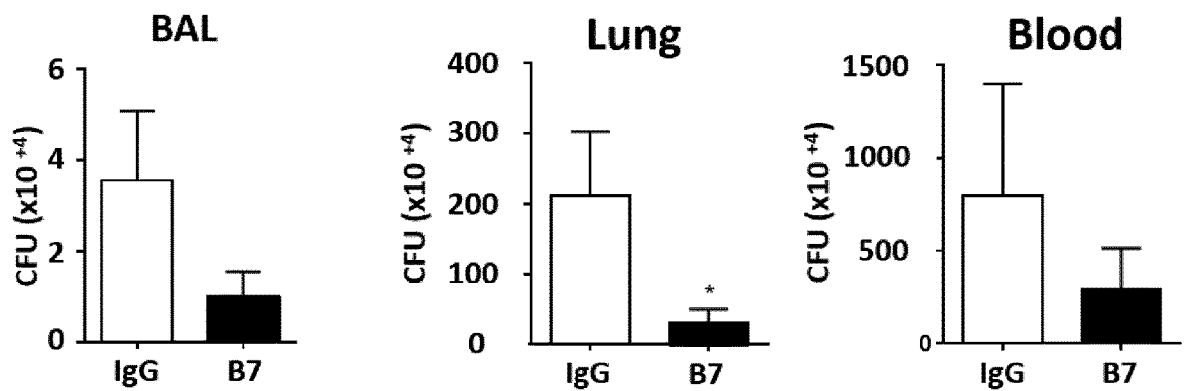

FIG. 6: Effect of treatment with the anti-IL-20Rb antibody (native B7 clone) in comparison with an isotype control (IgG) on the infection by *Streptococcus pneumoniae* in mice chronically exposed to cigarette smoke. Mice have been exposed to cigarette smoke during 12 weeks (5 cigarettes/day, 5 days/week) and after this, they have been treated by intraperitoneal administration of 100 µg/mice of each antibody, one day before and one day after the infection with *Streptococcus pneumoniae* (serotype 1, intranasal injection of 4×10$^5$ cfu). The bacterial load was evaluated at the peak of infection (day 3) in the bronchoalveolar lavages (BAL), the lung tissue and the blood. Results were expressed as mean±SEM of the cfu per ml (n=8-10 mice per group).

Figures 7A, 7B:
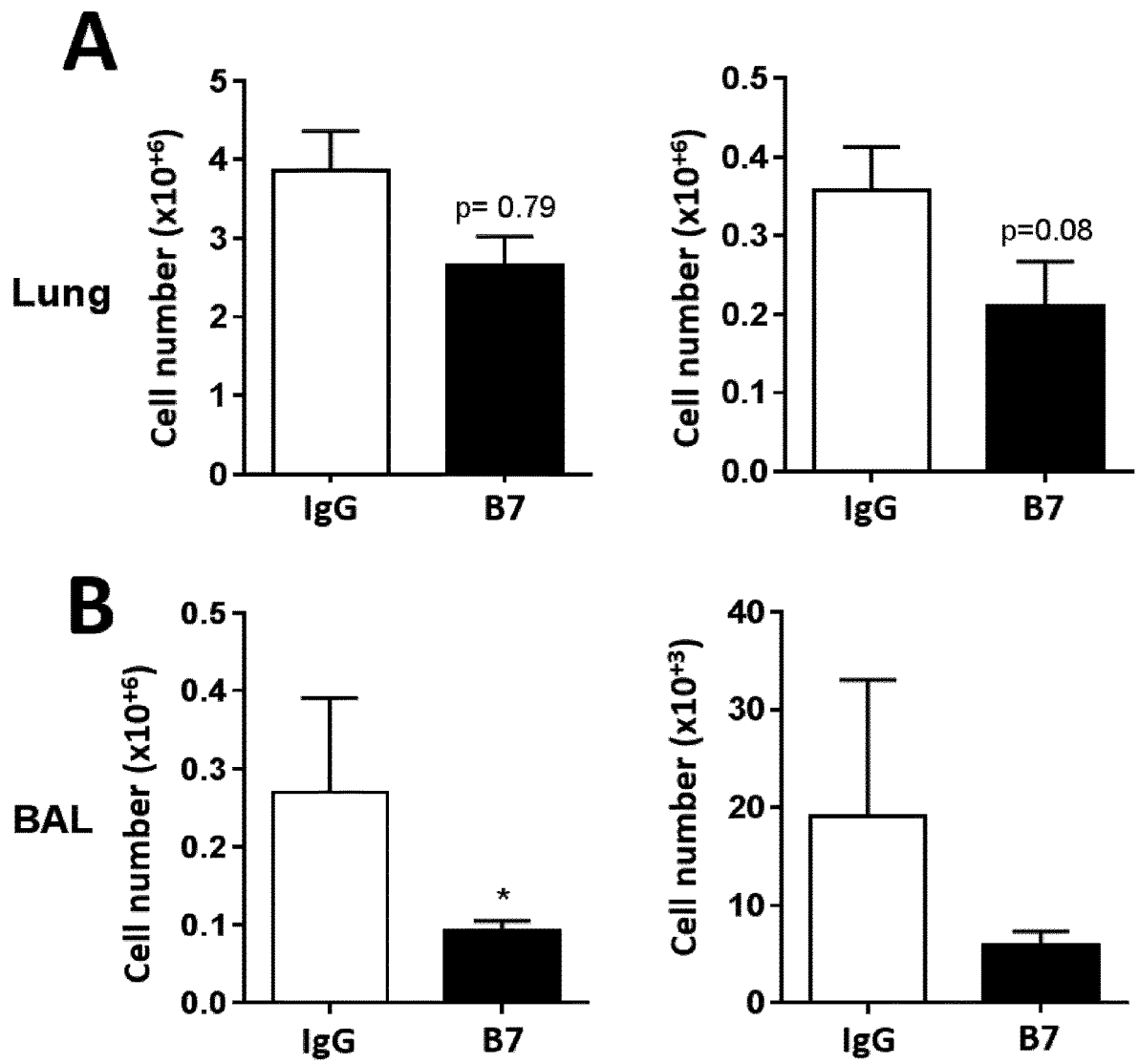

FIG. 7: Effect of treatment with the anti-IL-20Rb antibody (native B7 clone) in comparison with an isotype control (IgG) on the response to infection by *Streptococcus pneumoniae* in mice chronically exposed to cigarette smoke. Mice have been exposed to cigarette smoke during 12 weeks (5 cigarettes/day, 5 days/week) and after this, they have been treated by intraperitoneal administration of 100 µg/mice of each antibody, one day before and one day after the infection with *Streptococcus pneumoniae* (serotype 1, intranasal injection of 4×10$^5$ cfu). The total cell (A) and the neutrophil (B) (identified as CD45$^+$, CD11b$^{high}$ and Ly6G$^{high}$) numbers were evaluated at the peak of infection (day 3) in the bronchoalveolar lavages (BAL) and the lung tissue (obtained after enzymatic digestion with collagenase). Results were expressed as mean±SEM (n=8-10 mice per group).

Figure 8:
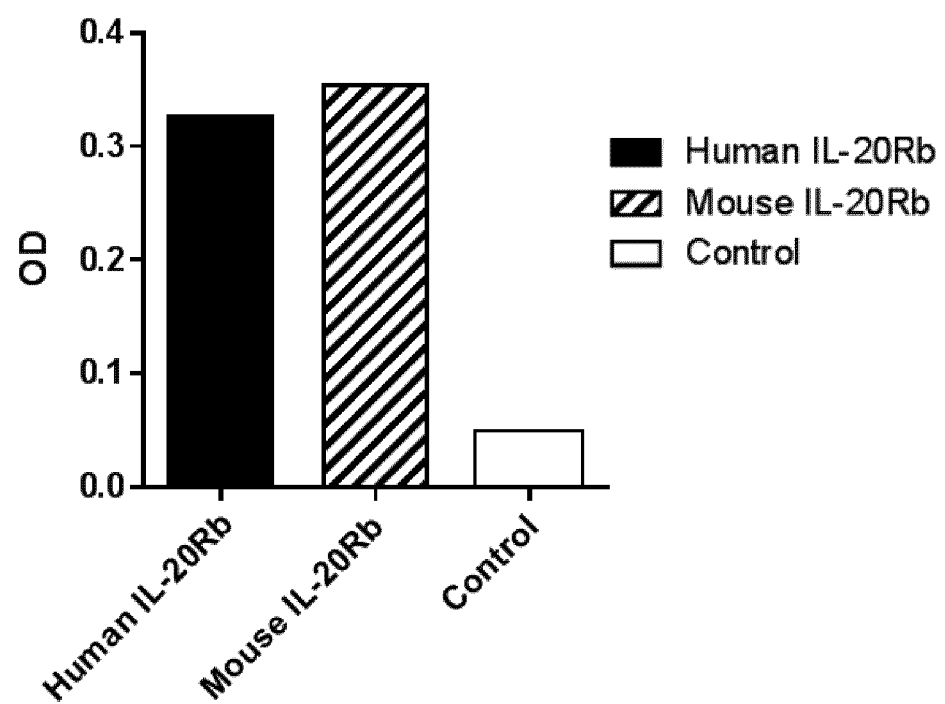

FIG. 8: Binding of the recombinant anti-IL-20Rb antibody (native B7clone (5 µg/ml)) to recombinant human and mouse IL-20Rb. The recombinant IL-20Rb protein is bound overnight at 4° C. to Nunc™ MaxiSorp plate at 1 µg/ml concentration in PBS. After saturation in PBS plus 10% fetal calf serum for 1 h, the antibodies were added at a concentration of 1 µg/ml for 2 h. After washings, the antibody binding was detected by addition of a biotinylated anti-murine IgG and then with streptavidin-HRP (Thermo Scientific™). The reaction is revealed by addition of the TMB substrate and the optical density was read at 495 nm. The results were expressed as the optical density.

FIG. 9: Western Blot analysis of the antigen recognized by the anti-IL-20Rb antibodies, either the 20RNTC and the B7 (native or mutated forms) clones. (A) Recombinant human IL-20Rb protein (1 µg/ml) was layered on each lane. After migration and transfer, each band was revealed with the corresponding antibody. (B) Cell lysates of the human HELA cell line were layered on each lane (10 µg per band).

After migration and transfer, each band was revealed with the corresponding antibody. (C) Protein extracts of lung and spleen tissue from control mice were layered on each lane (10 μg per band). After migration and transfer, each band was revealed with the corresponding antibody.

EXAMPLE

For our study we have developed an experimental model mimicking the COPD disease in mice by chronic exposure to cigarette smoke (CS) (13). These mice present an increased susceptibility to respiratory pathogens that was related to defective IL-22 production (14, 15). In contrast these animals exhibited an increased expression of IL-19, IL-20 and IL-24 in response to S. pneumoniae or NTHi. Treatment with anti-IL-20Rb blocking antibodies increased the bacterial clearance in control mice infected by S. pneumoniae (12) and protected CS-exposed mice from bacterial infection, by decreasing the bacterial burden and the inflammatory infiltrate (WO2016083304). Given these results, we hypothesized that IL-20 cytokines might be responsible for the increased susceptibility to bacterial infections in COPD mice through their inhibitory effect of Th17 cytokines production.

In order to evaluate their role during the exacerbation of COPD, CS-exposed mice were treated with blocking anti-IL20RB antibodies (clone 20RNTC, 50 μg/mice, intraperitoneal administration) one day before infection with Sp or NTHi. Measurement of bacterial load showed that treatment with anti-IL-20Rb antibody strongly decreased the bacterial load of Sp in BAL both at day 1 and 3 after infection and lung at day 3 after infection from COPD mice as compared with the mice treated with the isotype control. Moreover, this treatment also reduced the systemic dissemination of the bacteria.

Total and neutrophil counts were increased in COPD mice infected with Sp compared to Air mice. Treatment with anti-IL-20Rb antibodies decreased the number of neutrophils in the BAL. Similarly, the increased recruitment of dendritic cells induced by Sp was inhibited by blocking the IL-20Rb particularly at day 1 post-infection. On lung sections stained with hematoxylin/eosin, blocking the IL-20R receptors significantly inhibited the neutrophil and total inflammatory cell infiltrate and the tissue lesions. Moreover, we observed that this treatment is also effective after preventive or curative administration (either 24 h before or after infection). Our data suggest that IL-20Rb represents a potential therapeutic target in the context of bacteria-induced COPD exacerbations.

In order to develop a therapeutic tool for AE-COPD, we have selected our own clone of human neutralizing anti-IL-20Rb antibody by using a phage display approach. We have selected these clones according to their strong and specific recognition of the IL-20Rb by ELISA. They did not recognize the IL-20Ra and the IL-22Ra1 subunit.

We compare the binding of the recombinant anti-IL-20Rb antibodies (native and mutated B7) the rat anti-IL-20Rb monoclonal antibody (FIG. 1).

Figures 9A, 9B, 9C:
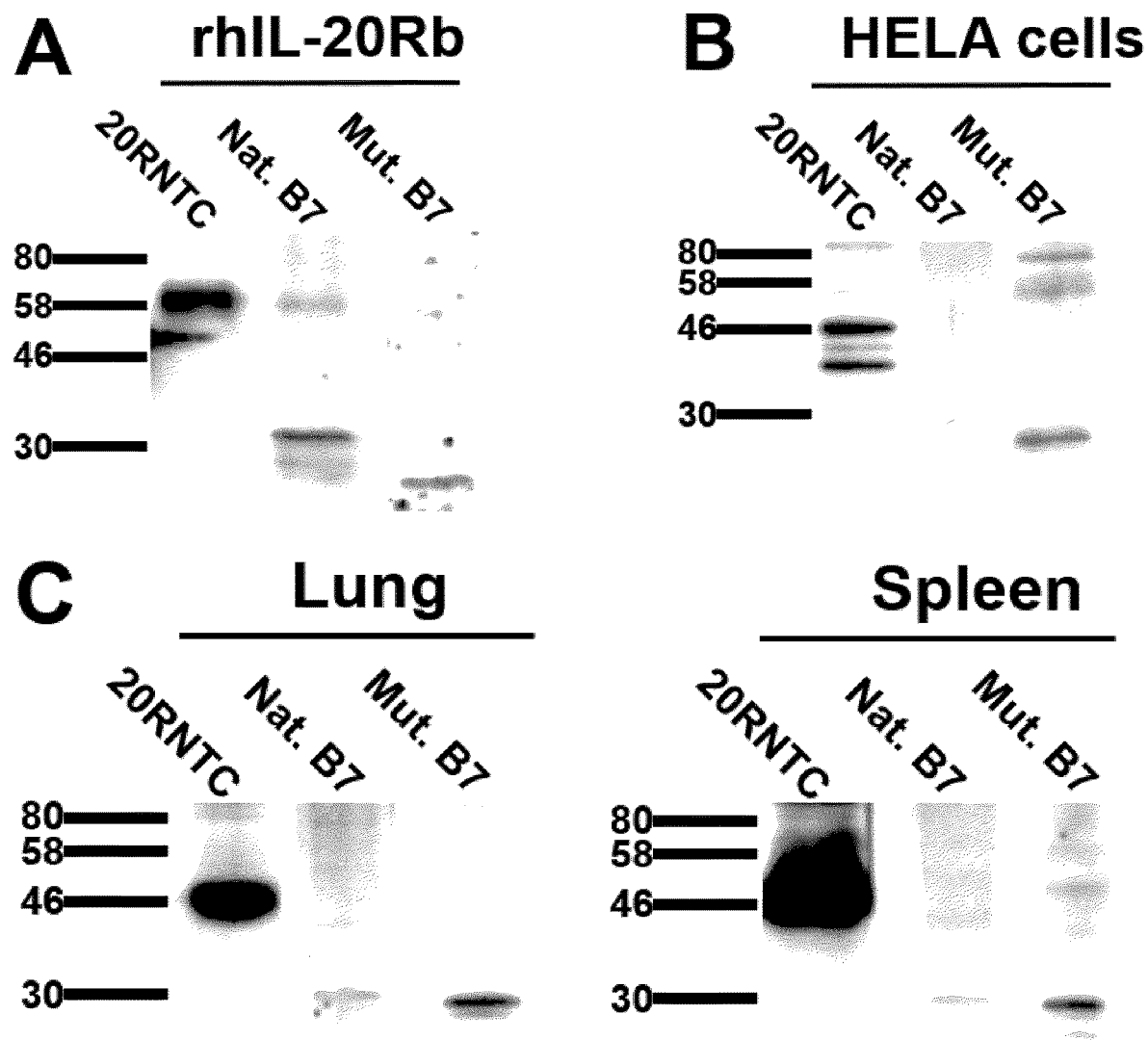

After this, we tested 5 clones for their ability to inhibit in vitro the biological function on airway epithelial cells (FIGS. 4 and 5) and dendritic cells (which both expressed the IL-20R). Our data revealed that the B7 clone inhibits the inflammatory activity of IL-19 and IL-20 on human AEC (FIGS. 4 and 5) and dendritic cells while it has superior effects comparing to 20RNTC antibody. The B7 clone also inhibit the IL-19-induced production of IL-6 in murine tracheal epithelial cells (FIG. 5). Interestingly, the B7 antibody shows a cross reactivity between human and murine IL-20Rb (FIG. 8). Moreover, the B7 antibody seems to bind to a different epitope from the 20RNTC antibody (FIGS. 9A-9C).

Figure 2A:
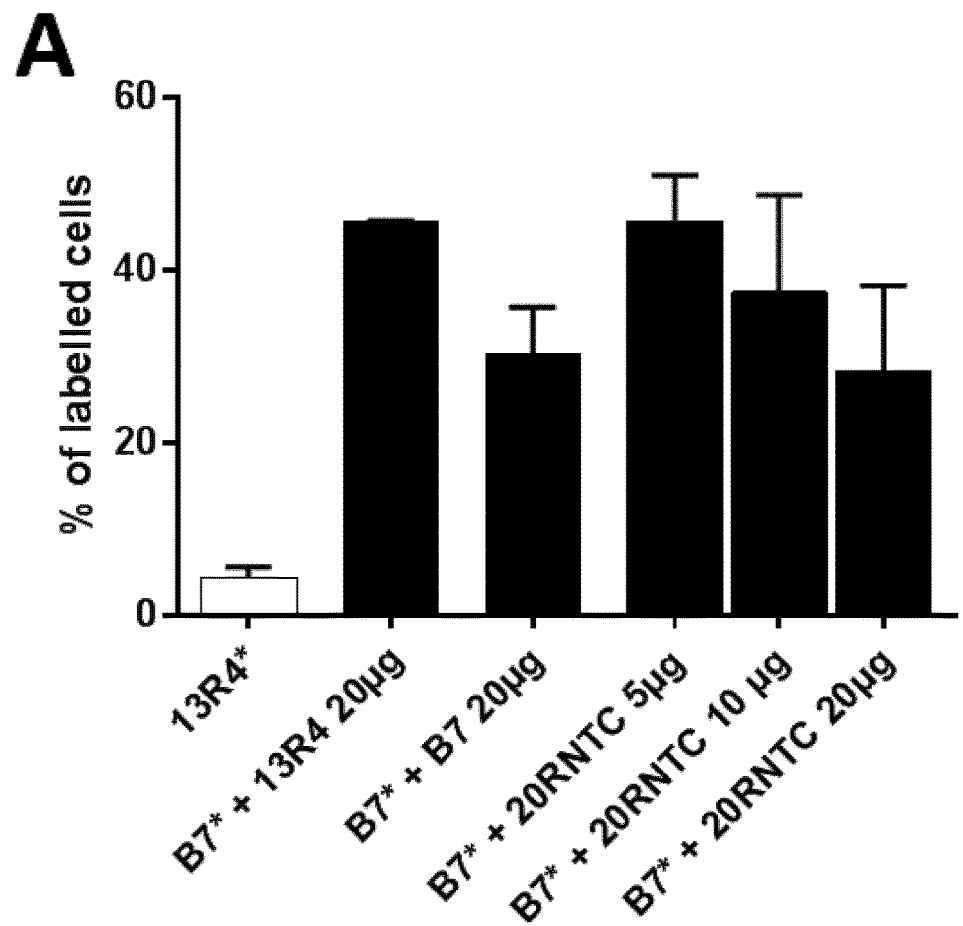
Figure 2B:
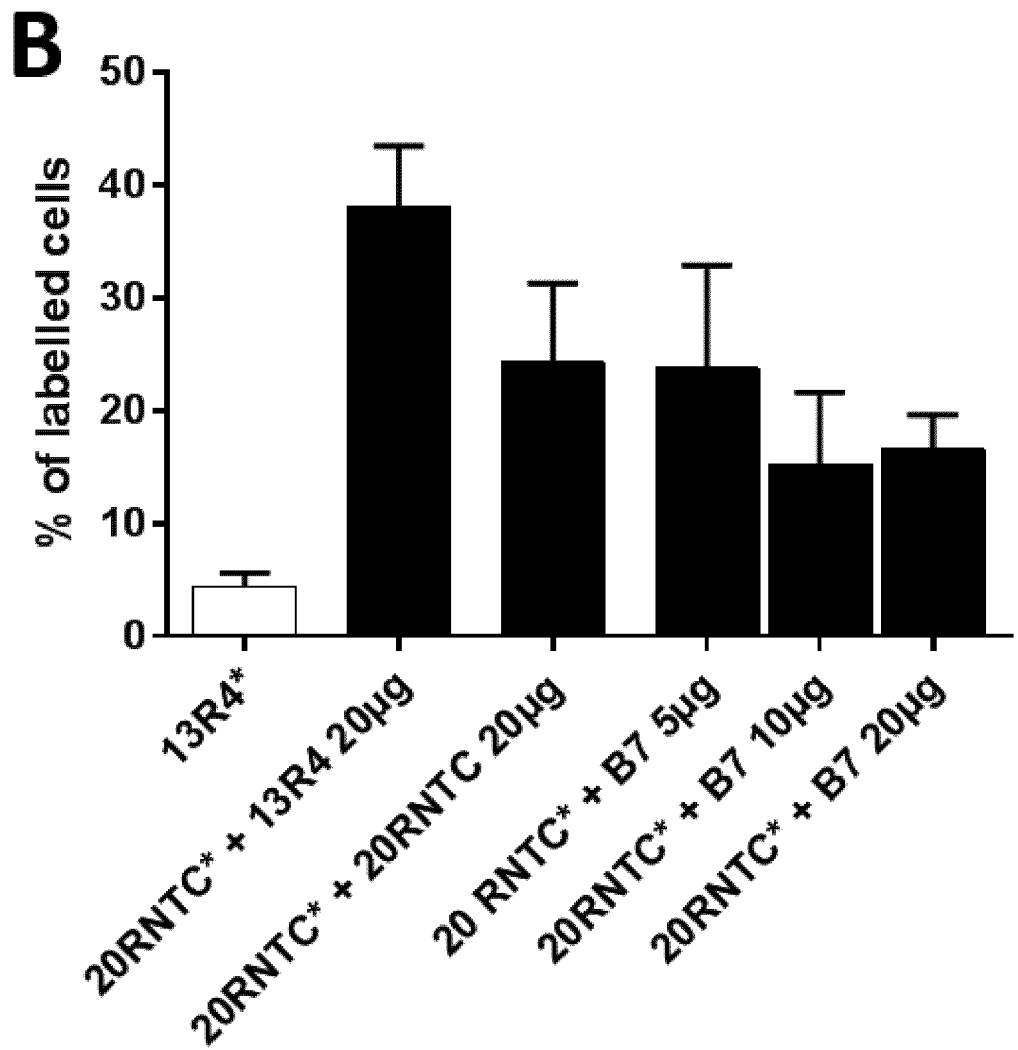

In addition, it takes a large amount of 20RNTC antibody to displace the B7 antibody while a small amount of the B7 antibody is required to displace the 20RNTC antibody. There is therefore a different affinity between both antibodies and the affinity of the B7 antibody is better (FIGS. 2A, 2B and 3). This is true for both the heterodimeric receptor expressed by dendritic cells (FIGS. 2A and 2B) and for the human recombinant IL-20RB (FIG. 3).

After integration of VH/VL region of our human clone B7 in a murine IgG2a isotype, this antibody has been tested in our model of COPD exacerbation and compared to the 20RNTC clone. Our data showed that treatment with the B7 clone decreased the bacterial load (FIG. 6) and the inflammatory infiltrate (FIGS. 7A and 7B) at a level similar to the 20RNTC antibody.

To conclude, the B7 antibody of the present invention is cross reactant on both human and mouse IL-20RB, bind to a different epitope from the 20RNTC antibody, the B7 antibody has superior effects on the inhibition of the inflammatory activity of IL-19 and IL-20 in comparison with the 20RNTC antibody and the B7 antibody has a better affinity for IL-20Rb than the 20RNTC antibody.

REFERENCES

Throughout this application, various references describe the state of the art to which this invention pertains. The disclosures of these references are hereby incorporated by reference into the present disclosure.

The invention claimed is:

1. A monoclonal antibody which cross-competes for binding to IL-20Rb with the monoclonal antibody comprising a heavy chain comprising the following CDRs i) the VH-CDR1 as set forth in SEQ ID NO:2 (NY-X3-MN wherein X3 is S or A), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

2. The monoclonal antibody of claim 1 which cross-competes for binding to IL-20Rb with the monoclonal antibody comprising a heavy chain comprising the following CDRs i) the VH-CDR1 as set forth in SEQ ID NO:8 (NYSMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

3. The monoclonal antibody of claim 1 which cross-competes for binding to IL-20Rb with the monoclonal antibody comprising a heavy chain comprising the following CDRs i) the VH-CDR1 as set forth in SEQ ID NO:9 (NYAMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

4. The monoclonal antibody of claim 1 which is chimeric, a humanized or a human antibody.

5. A monoclonal antibody having specificity for IL-20Rb which comprises a heavy chain comprising the following CDRs i) the VH-CDR1 as set forth in SEQ ID NO: 2 (NY-X3-MN wherein X3 is S or A), ii) the VH-CDR2 as set forth in SEQ ID NO: 3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGG-NYYVS), ii) the VL-CDR2 as set forth in SEQ ID NO:6 (GDSYRPS) and iii) the VL-CDR3 as set forth in SEQ ID NO:7 (SSYTYYSTRV).

6. The monoclonal of claim 5 which comprises a heavy chain comprising the following CDRs i) the VH-CDR1 as set forth in SEQ ID NO:8 (NYSMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

7. The monoclonal of claim 5 which comprises a heavy chain comprising the following CDRs i) the VH-CDR1 as set forth in SEQ ID NO:9 (NYAMN), ii) the VH-CDR2 as set forth in SEQ ID NO:3 (YISGSSRYISYADFVKG) and iii) the VH-CDR3 as set forth in SEQ ID NO:4 (SYYGMDV) and a light chain comprising the following CDRs: i) the VL-CDR1 as set forth in SEQ ID NO:5 (AGTSSDVGGNYYVS), ii) the VL-CDR2 as set forth in SEQ ID NO:6 (GDSYRPS) and iii) the VL-CDR3 as set forth in SEQ ID NO:7 (SSYTYYSTRV).

8. The monoclonal antibody of claim 5 which comprises a heavy chain having 70% of identity with SEQ ID NO:10 or SEQ ID NO: 11 and/or a light chain having 70% of identity with SEQ ID NO:12.

9. The antibody of claim 4 which comprises the heavy chain as set forth in SEQ ID NO: 10 or SEQ ID NO:11 and the light chain as set forth in SEQ ID NO:12.

10. The antibody of claim 1 which does not comprise a Fc region that mediates antibody-dependent cell-mediated cytotoxicity and thus does not comprise an Fc portion that induces antibody dependent cellular cytotoxicity (ADCC).

11. The antibody of claim 5 which does not comprise a Fc region that mediates antibody-dependent cell-mediated cytotoxicity and thus does not comprise an Fc portion that induces antibody dependent cellular cytotoxicity (ADCC).

12. A pharmaceutical composition comprising the monoclonal antibody of claim 1.

13. A pharmaceutical composition comprising the monoclonal antibody of claim 5.

14. A nucleic acid molecule encoding for a heavy chain and/or a light chain of the antibody of claim 1.

15. An isolated host cell which has been transfected, infected or transformed by the nucleic acid of claim 14.

16. A nucleic acid molecule encoding for a heavy chain and/or a light chain of the antibody of claim 5.

17. An isolated host cell which has been transfected, infected or transformed by the nucleic acid of claim 16.

18. A method of treating bacterial-induced exacerbations of chronic obstructive pulmonary disease in a subject in need thereof comprising administering to the subject a therapeutically effective amount of the monoclonal antibody of claim 1.

19. A method of treating bacterial-induced exacerbations of chronic obstructive pulmonary disease in a subject in need thereof comprising administering to the subject a therapeutically effective amount of the monoclonal antibody of claim 5.

* * * * *